(12) United States Patent
Shannon et al.

(10) Patent No.: US 7,937,430 B1
(45) Date of Patent: May 3, 2011

(54) SYSTEM AND METHOD FOR COLLECTING AND TRANSMITTING DATA IN A COMPUTER NETWORK

(75) Inventors: Jeffrey L. Shannon, Birmingham, AL (US); John DeCastra, Birmingham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1140 days.

(21) Appl. No.: 10/288,771

(22) Filed: Nov. 6, 2002

Related U.S. Application Data

(60) Provisional application No. 60/400,464, filed on Jul. 31, 2002.

(51) Int. Cl.
*G06F 15/16* (2006.01)
(52) U.S. Cl. .......................... 709/200; 709/206; 709/219
(58) Field of Classification Search .................. 709/200, 709/203–207, 217–219, 227
See application file for complete search history.

(56) References Cited

U.S. PATENT DOCUMENTS

| | | | |
|---|---|---|---|
| 5,564,037 A | 10/1996 | Lam | |
| 5,918,004 A | 6/1999 | Anderson | |
| 5,968,117 A * | 10/1999 | Schuetze | 709/206 |
| 6,085,231 A * | 7/2000 | Agraharam et al. | 709/206 |
| 6,434,602 B1 * | 8/2002 | Hazan et al. | 709/206 |
| 6,434,745 B1 | 8/2002 | Conley et al. | |
| 6,532,459 B1 | 3/2003 | Berson | |
| 6,622,116 B2 | 9/2003 | Skinner et al. | |
| 6,836,895 B2 | 12/2004 | Hamlin | |
| 6,904,417 B2 | 6/2005 | Clayton et al. | |
| 6,965,918 B1 * | 11/2005 | Arnold et al. | 709/206 |
| 6,973,434 B2 | 12/2005 | Miller | |
| 7,106,850 B2 | 9/2006 | Campbell et al. | |
| 7,296,070 B2 | 11/2007 | Sweeney et al. | |
| 2002/0019828 A1 | 2/2002 | Morti | |
| 2002/0049806 A1 | 4/2002 | Gatz et al. | |
| 2002/0059099 A1 | 5/2002 | Coletta | |
| 2002/0073204 A1 | 6/2002 | Dutta et al. | |
| 2002/0095395 A1 | 7/2002 | Larson et al. | |
| 2002/0120866 A1 | 8/2002 | Mitchell et al. | |
| 2002/0184085 A1 | 12/2002 | Lindia et al. | |
| 2003/0097451 A1 | 5/2003 | Bjorksten et al. | |
| 2003/0110076 A1 | 6/2003 | Holt | |

FOREIGN PATENT DOCUMENTS

GB      2283341 A  * 10/1993

OTHER PUBLICATIONS

Outlook 2000, Figures 1-10. Product released by Microsoft Corporation in 1999.*

(Continued)

*Primary Examiner* — Faruk Hamza
(74) *Attorney, Agent, or Firm* — Thomas, Kayden, Horstemeyer & Risley, LLP

(57) ABSTRACT

Systems and methods are presented for collecting and transmitting data. In one embodiment, a computer program (or code) is implemented on a computer-readable medium. In this embodiment, computer code is adapted to establish a connection between a workstation and a central server, collect data from the workstation, write the collected data to the central server, and sever the connection between the workstation and the central server. Correspondingly, another embodiment is a method comprising the steps of establishing a connection between a workstation and a central server, collecting data from the workstation, writing the collected data to the central server, and severing the connection between the workstation and the central server.

26 Claims, 40 Drawing Sheets

OTHER PUBLICATIONS

Zantaz; "Digital Safe Service"; Web Address: http://web.archive.org/web20010202173018/www.zantaz.com/services/digital_safe/index.cfm; Date Printed: Oct. 19, 2006; pp. 1.

Zantaz; "Frequently Asked Questions"; http://web.archive.org/web20010608181200/www.zantaz.com/services/TechInfo/index.cfm; Dated Printed: Oct. 19, 2006; pp. 5.

SpectorSoft; "Spector Pro for Windows"; Product Description—The Most Intelligent Internet Monitoring & Surveillance Software Available Anywhere!; Dated: Jun. 3, 2002; pp. 6.

Jeffrey L. Shannon, Non Final Office Action, mailed Apr. 21, 2006, filed Nov. 6, 2002 U.S. Appl. No. 10/288,771.

Jeffrey L. Shannon, Final Office Action, mailed Oct. 3, 2006, filed Nov. 6, 2002 U.S. Appl. No. 10/288,771.

Jeffrey L. Shannon, Non Final Office Action, mailed Apr. 6, 2007, filed Nov. 6, 2002 U.S. Appl. No. 10/288,771.

Jeffrey L. Shannon, Final Office Action, mailed Sep. 24, 2007, filed Nov. 6, 2002 U.S. Appl. No. 10/288,771.

Jeffrey L. Shannon, Non Final Office Action, mailed Nov. 1, 2006, filed Nov. 6, 2002 U.S. Appl. No. 10/288,041.

Jeffrey L. Shannon, Final Office Action, mailed Mar. 7, 2007, filed Nov. 6, 2002 U.S. Appl. No. 10/288,041.

Jeffrey L. Shannon, Non Final Office Action, mailed Aug. 20, 2007, filed Nov. 6, 2002 U.S. Appl. No. 10/288,041.

Spector; "Spector and eBlaster Spy Software and Internet Monitoring;" Jun. 3, 2002; 3 pages.

Shannon; U.S. Appl. No. 10/289,041, filed Nov. 6, 2002.

DeCastra; U.S. Appl. No. 11/554,341, filed Oct. 30, 2006.

Shannon; Examiner Interview Summary Record mailed May 17, 2007 for U.S. Appl. No. 10/289,041, filed Nov. 6, 2002.

Shannon; Final Rejection mailed Feb. 7, 2008 for U.S. Appl. No. 10/289,041, filed Nov. 6, 2002.

DeCastra; Non-Final Rejection mailed Feb. 19, 2008 for U.S. Appl. No. 11/554,341, filed Oct. 30, 2006.

Spector; "Spector Product Description"; Jun. 3, 2002, pp. 1-6.

Shannon; Final Rejection mailed Mar. 7, 2007; U.S. Appl. No. 10/289,041, filed Nov. 6, 2002.

Shannon; Non-Final Rejection mailed Aug. 20, 2007; U.S. Appl. No. 10/289,041, filed Nov. 6, 2002.

Shannon; Non-Final Rejection mailed Nov. 1, 2006; U.S. Appl. No. 10/289,041, filed Nov. 6, 2002.

Shannon; Non-Final Rejection mailed Jul. 10, 2008 for U.S. Appl. No. 10/289,041, filed Nov. 6, 2002.

DeCastra, Non-Final Rejection mailed May 5, 2009 for U.S. Appl. No. 11/554,341, filed Oct. 30, 2006.

DeCastra; Final Rejection mailed Aug. 5, 2008 for U.S. Appl. No. 11/554,341, filed Oct. 30, 2006.

Shannon; Final Rejection mailed Oct. 27, 2008 for U.S. Appl. No. 10/289,041, filed Nov. 6, 2002.

Shannon; Non-Final Rejection mailed Apr. 14, 2009 for U.S. Appl. No. 10/289,041, filed Nov. 6, 2002.

DeCastra; Final Office Action mailed Jun. 29, 2009 for U.S. Appl. No. 11/554,341, filed Oct. 30, 2006.

* cited by examiner

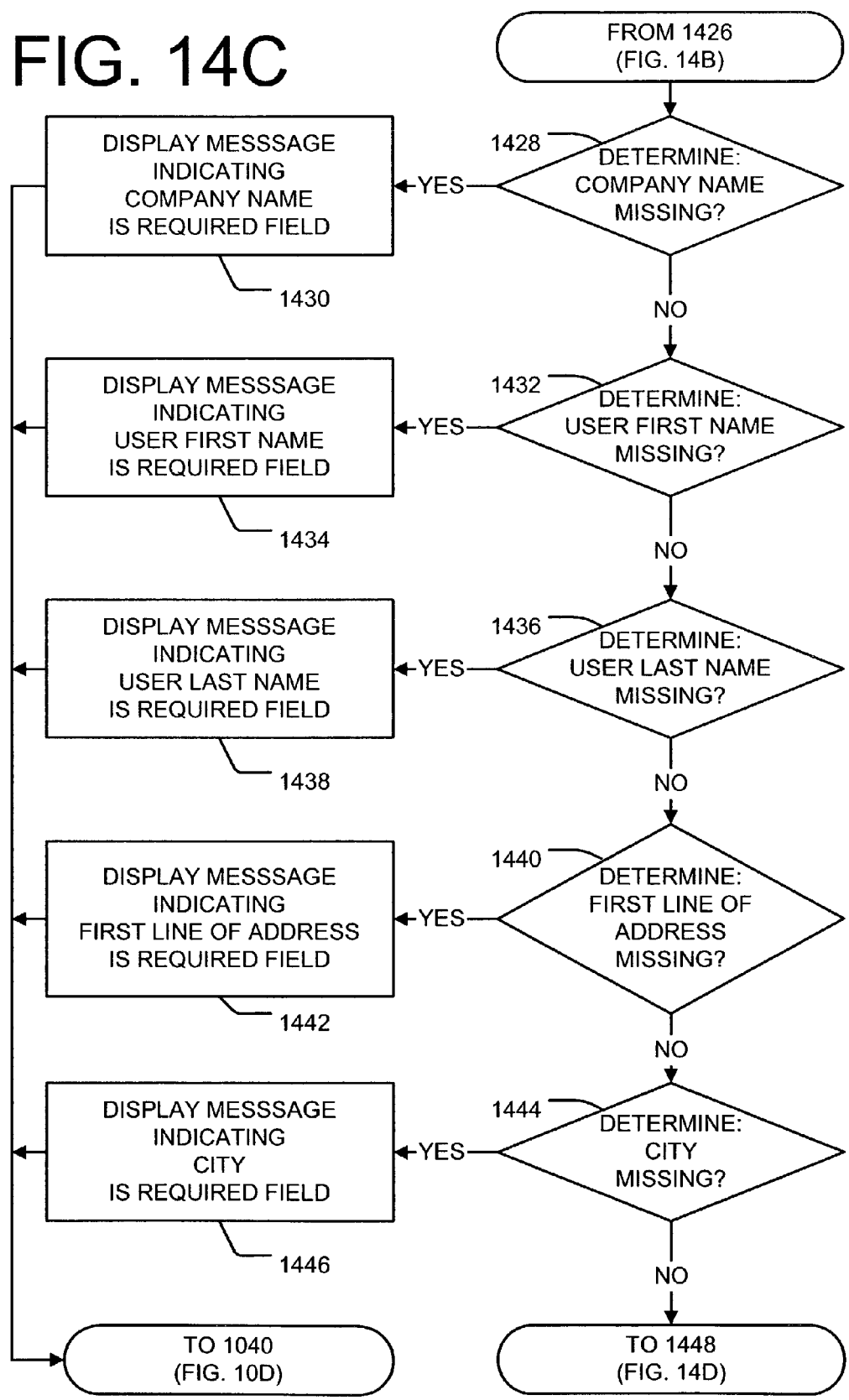

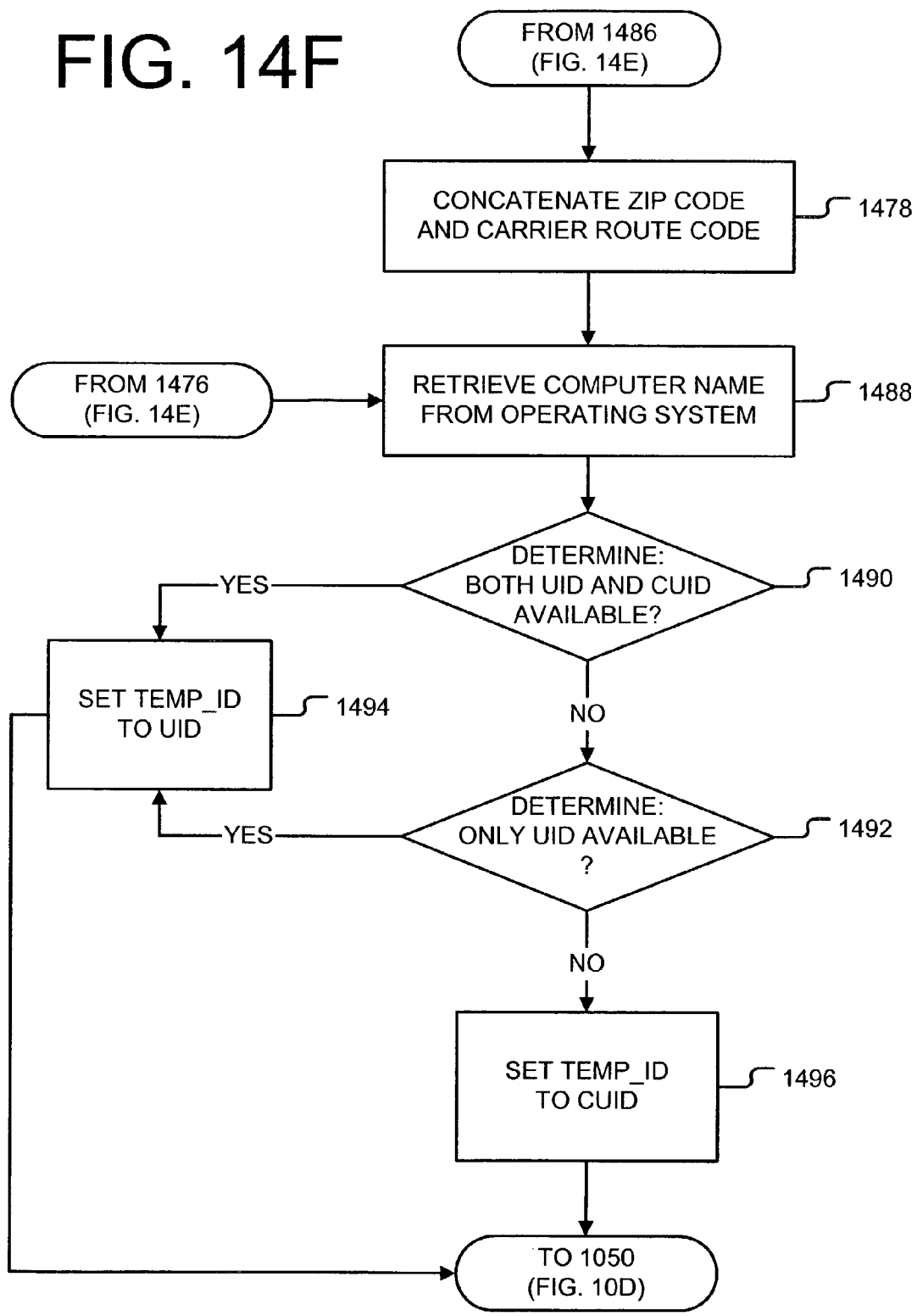

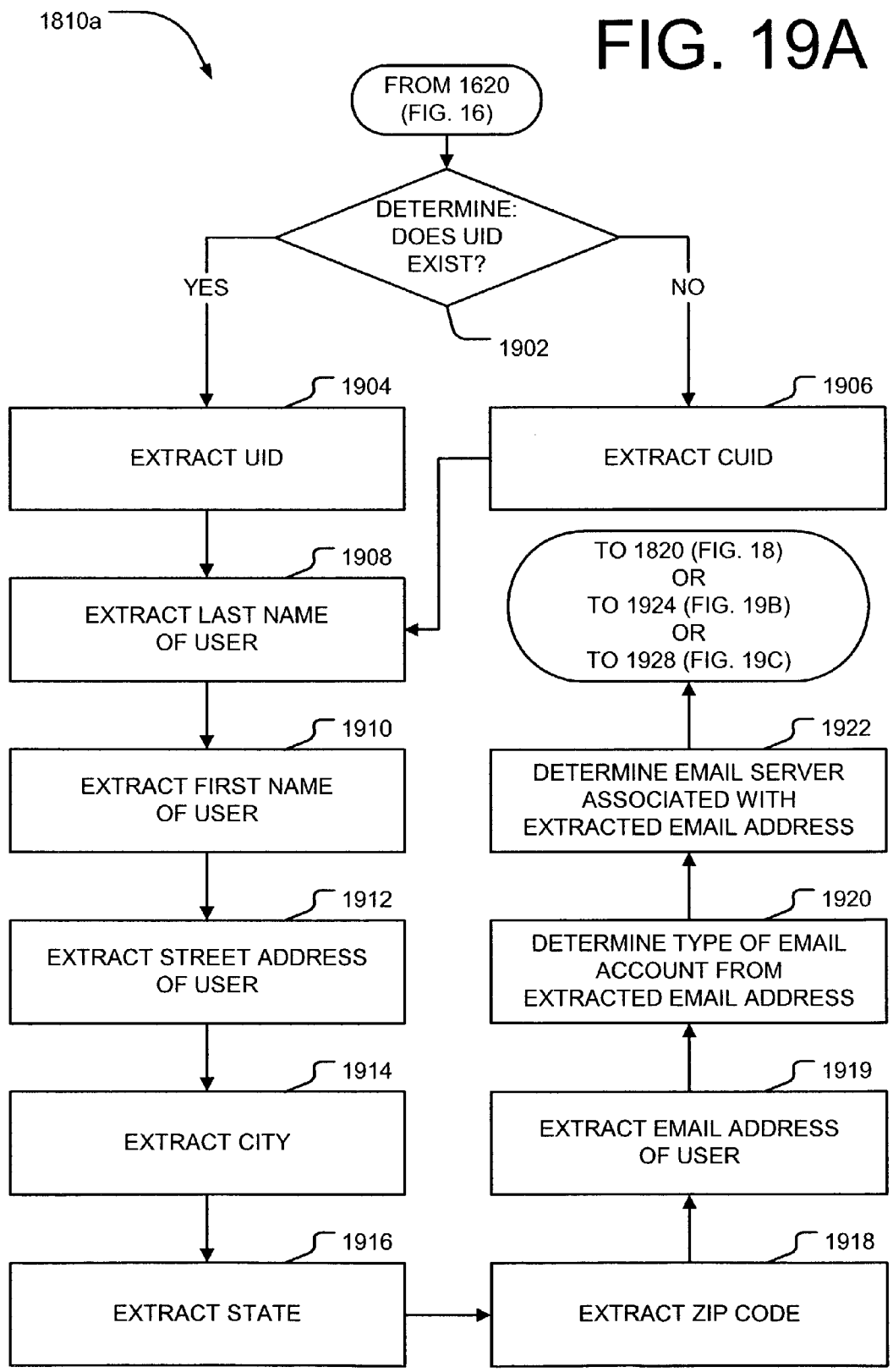

US 7,937,430 B1

SYSTEM AND METHOD FOR COLLECTING AND TRANSMITTING DATA IN A COMPUTER NETWORK

CROSS-REFERENCE TO RELATED APPLICATIONS

This application claims the benefit of U.S. Provisional Patent Application Ser. No. 60/400,464 filed on Jul. 31, 2002, and entitled "Electronic Data File Collection," which is hereby incorporated by reference in its entirety.

FIELD OF INVENTION

The present disclosure relates generally to computer networks and, more particularly, to a system and method for collecting and transmitting data in a computer network.

BACKGROUND

In many different contexts, it is often useful to gather information related to specific individuals. For example, during the process of legal discovery, it may be necessary to gather information related to key witnesses, employees related to a corporation, or any other key individual related to the litigation at hand. Typically, in these types of situations, an attorney or legal expert would often physically trek to the key individual's desk to review documents and gather information stored on the key individual's workstation. Once the attorney or legal expert copied or printed the appropriate files, those files would be physically carried back to the attorney or legal expert's office. The attorney or legal expert would sift through the gathered files and, if necessary, trek back to the key individual's desk to gather more information. As one can imagine, whether in the legal context or any other information-gathering context, this process would be tedious and costly.

In view of the arduousness of such a process, a heretofore-unaddressed need exists in the industry.

SUMMARY

The present disclosure provides systems and methods for collecting data in computer networks.

Briefly described, in architecture, one embodiment comprises a computer program (or code) implemented on a computer-readable medium. In this embodiment, computer code is adapted to instruct a programmable device to establish a connection between a workstation and a central server, collect data from the workstation, write the collected data to the central server, and sever the connection between the workstation and the central server.

The present invention can also be viewed as providing methods for collecting data in computer networks.

In this regard, another embodiment is a method comprising the steps of establishing a connection between a workstation and a central server, collecting data from the workstation, writing the collected data to the central server, and severing the connection between the workstation and the central server.

Other systems, methods, features, and advantages of the present disclosure will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 14A through 14F are flowcharts showing, in greater detail, the CHECK_USER_INPUTS subroutine shown in FIG. 10D.

FIGS. 19A through 19C are flowcharts showing, in greater detail, the step of extracting information associated with the user shown in FIG. 18.

DETAILED DESCRIPTION OF THE PREFERRED EMBODIMENTS

Figure 1:
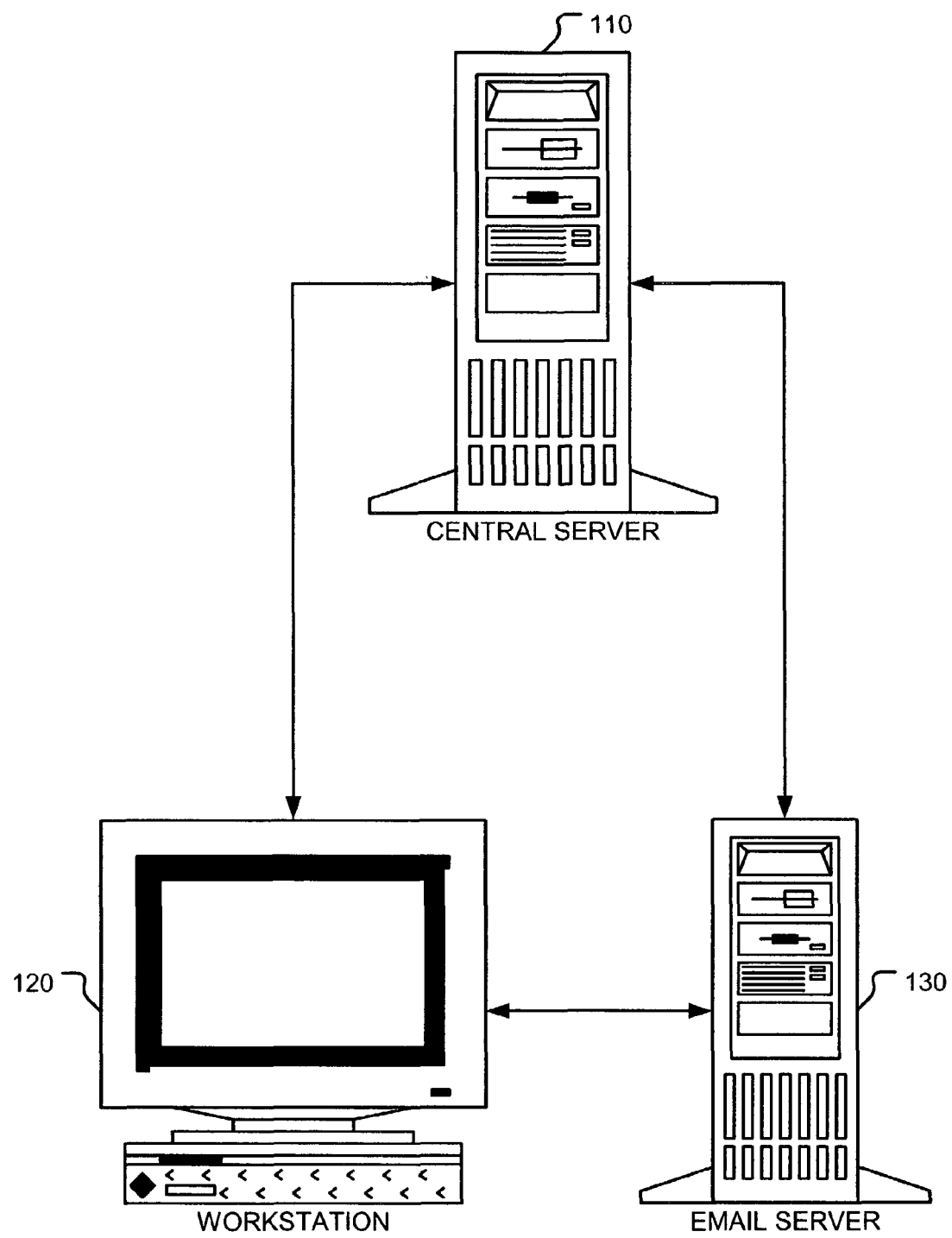
FIG. 1 is a block diagram of a computer network showing a workstation, a central server, and an email server.

Having summarized various aspects of the present disclosure, reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

FIG. 1 is a block diagram of a computer network showing a workstation 120, a central server 110, and an email server 130. As shown in FIG. 1, the central server 110 is coupled to the workstation 120, thereby permitting communication between the central server 110 and the workstation 120. Similarly, the workstation 120 is coupled to an email server 130, which permits a user (not shown) at the workstation 120 to access an email account (not shown) on the email server 130. The email server 130 is, in turn, coupled to the central server 110, thereby permitting communication between the central server 110 and the email server 130. As described below, the interconnection between the central server 110, the workstation 120, and the email server 130 permits the exchange of information between the central server 110, the workstation 120, and the email server 130. While a workstation 120 is specifically shown in FIG. 1, it will be clear to one of ordinary skill in the art that the workstation 120 may be a personal computer, a stand-alone electronic data storage device at a user's site, or any other type of programmable device with data storage capabilities that may be connected to the network. Thus, it is intended for the workstation 120 to represent any programmable device that may be adapted to perform the steps outlined in FIGS. 4 through 9 or, additionally, the steps outlined in FIGS. 10A through 15E. Since these programmable devices are well known in the art, further discussion of these programmable devices is omitted here. Also, while the term central server 110 is used throughout the disclosure, it will be clear to one of ordinary skill in the art that the central server 110 may also be any programmable device with sufficient computing power to perform the steps outlined below with reference to FIGS. 16 through 21. In this regard, the workstation 120 and the central server 110 may communicate with each other over the Internet, or through a local area network (LAN) connection, among others. Thus, the workstation 120 and the central server 110 may be located remotely from each other or may be co-located at a common network site, among others.

Figure 2:
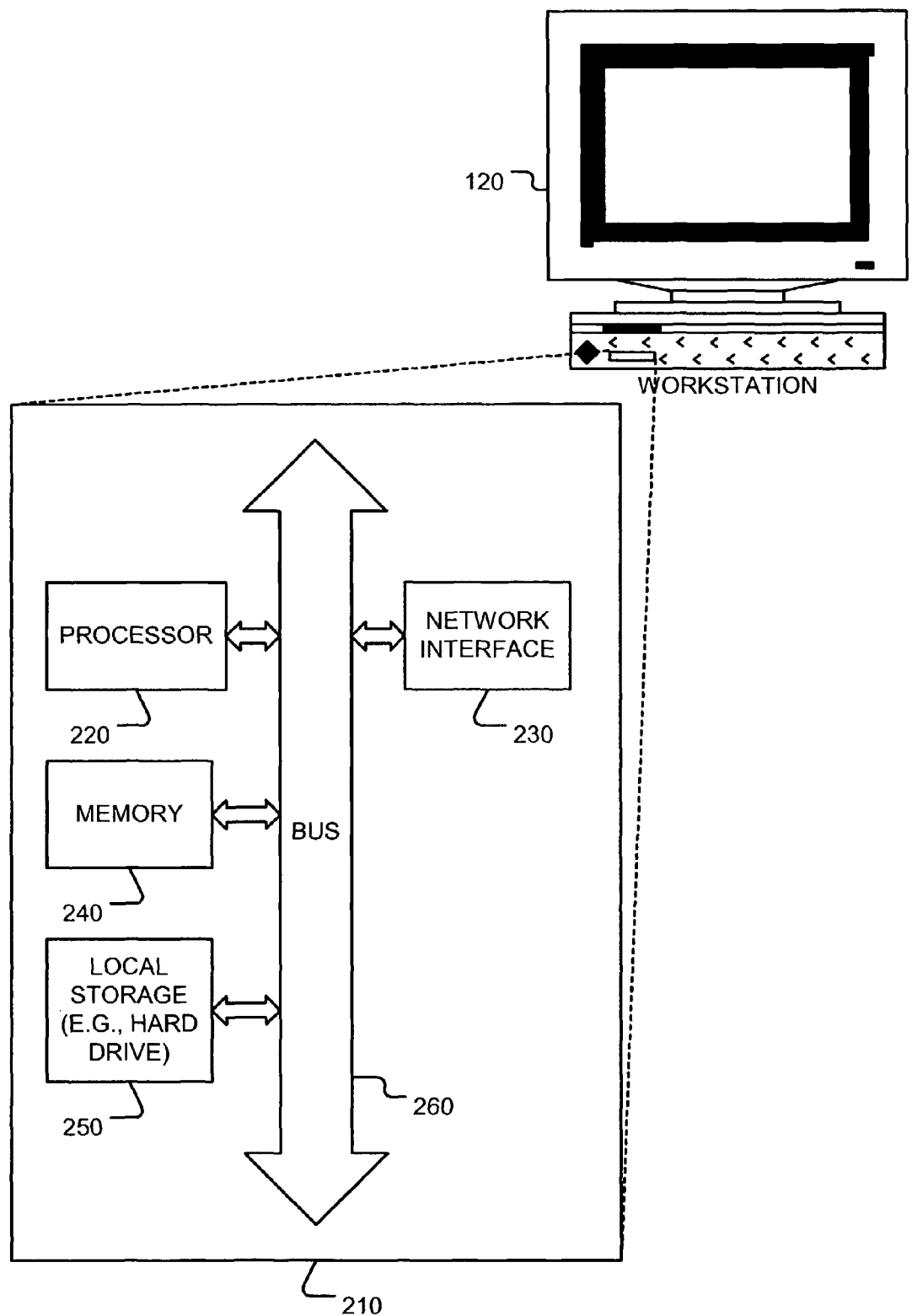
FIG. 2 is a block diagram showing components of the workstation of FIG. 1.

FIG. 2 is a block diagram showing components of the workstation 120 of FIG. 1. As shown in FIG. 2, the workstation 120 comprises a system board 210 that includes a processor 220, a network interface 230, a memory 240, a local storage device 250, and a bus 260 that permits communication between the various components. In a preferred embodiment, the local storage device 250 may be a hard drive configured to electronically store data. The local storage device 250 may also store computer programs that execute on the workstation 120. In this sense, the processor 220 is configured to access any program that is stored on the local storage device 250, and execute the program with the assistance of the memory 240. Since the functioning of computing devices is well known in the art, further discussion of the processor 220, the memory 240, and the local storage device 250 are omitted here. While the various components are shown as residing on a single system board 210, it will be clear to one of ordinary skill in the art that the various components may reside at different locations, so long as they are coupled to each other to allow communication between the components.

The network interface 230 of FIG. 2 is configured to provide an interface between the workstation 120 and the network. Thus, the network interface 230 provides the interface for the workstation 120 to receive any data that may be entering from the network and, also, to transmit any data from the workstation 120 to the network. Specifically, in one example embodiment, the network interface 230 is configured to permit communication between the workstation 120 and the central server 110 (FIG. 1) and, additionally, to permit communication between the workstation 120 and the email server 130 (FIG. 1). In this regard, the network interface 230 may be a modem, a network card, or any other interface that interfaces the workstation 120 to a network.

Figure 3:
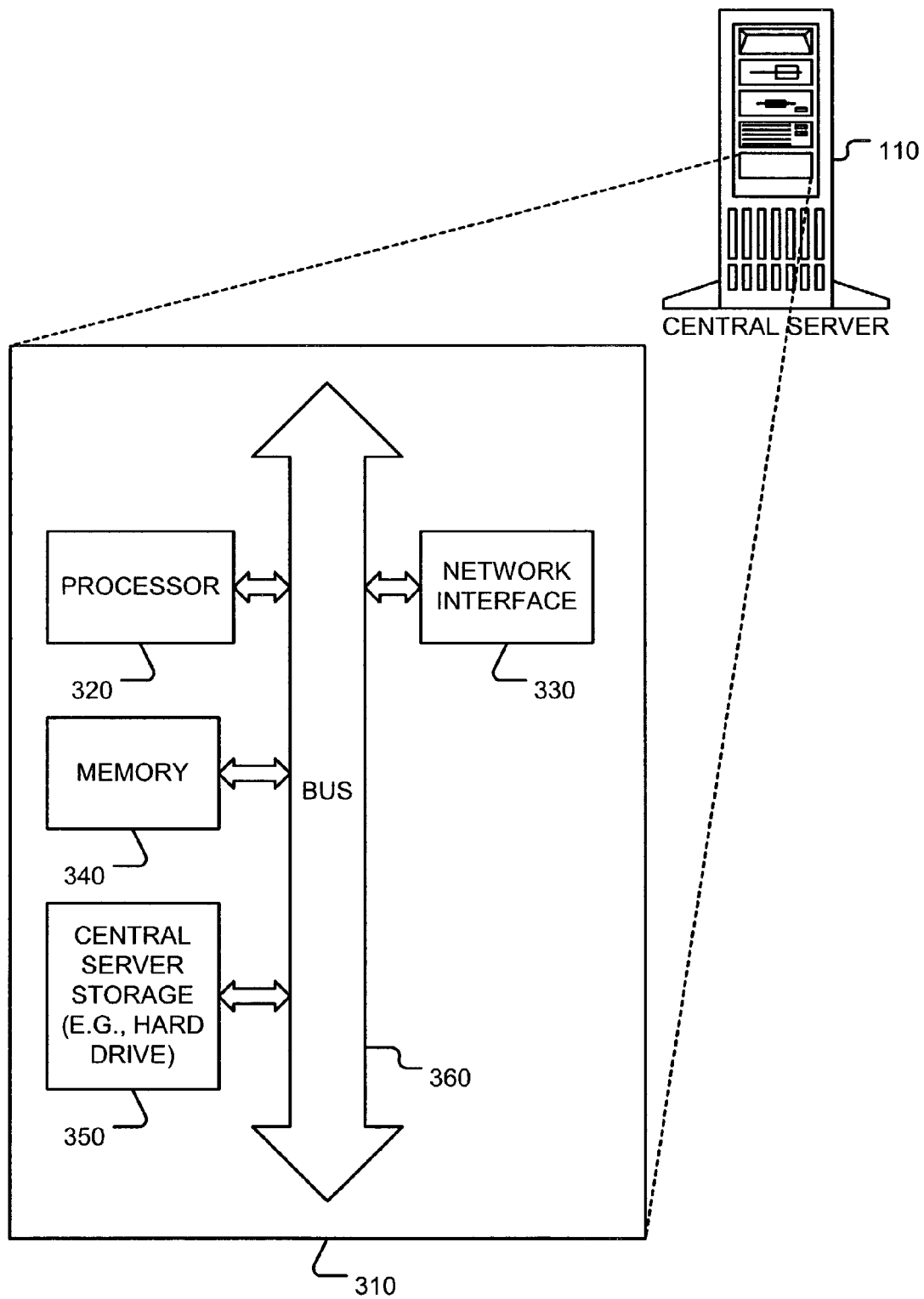
FIG. 3 is a block diagram showing components of the central server of FIG. 1.

FIG. 3 is a block diagram showing components of the central server 110 of FIG. 1. As shown in FIG. 3, the central server 110 comprises a system board 310 that includes a processor 320, a network interface 330, a memory 340, a local storage device 350, and a bus 360 that permits communication between the various components. In a preferred embodiment, the local storage device 350 may be a hard drive configured to electronically store data. The local storage device 350 may also store computer programs that execute on the central server 110. In this sense, the processor 320 is configured to access any program that is stored on the local storage device 350, and execute the program with the assistance of the memory 340. Since computing devices and their operation are well known in the art, further discussion of the processor 320, the memory 340, and the local storage device 350 are omitted here. While the various components are shown as residing on a single system board 310, it will be clear to one of ordinary skill in the art that the various components may reside at different locations, so long as they are coupled to each other to allow communication between the components.

The network interface 330 of FIG. 3 is configured to provide an interface between the central server 110 and the network. Thus, the network interface 330 provides the interface for the central server 110 to receive any data that may be entering from the network and, also, to transmit any data that the central server 110 may wish to transmit to the network. Specifically, in an example embodiment, the network interface 330 is configured to permit communication between the central server 110 and the workstation 120 (FIG. 1) and, additionally, to permit communication between the central server 110 and the email server 130 (FIG. 1). In this regard, the network interface 230 may be a modem, a network card, or any other interface that interfaces the workstation 120 to a network.

Figure 4:
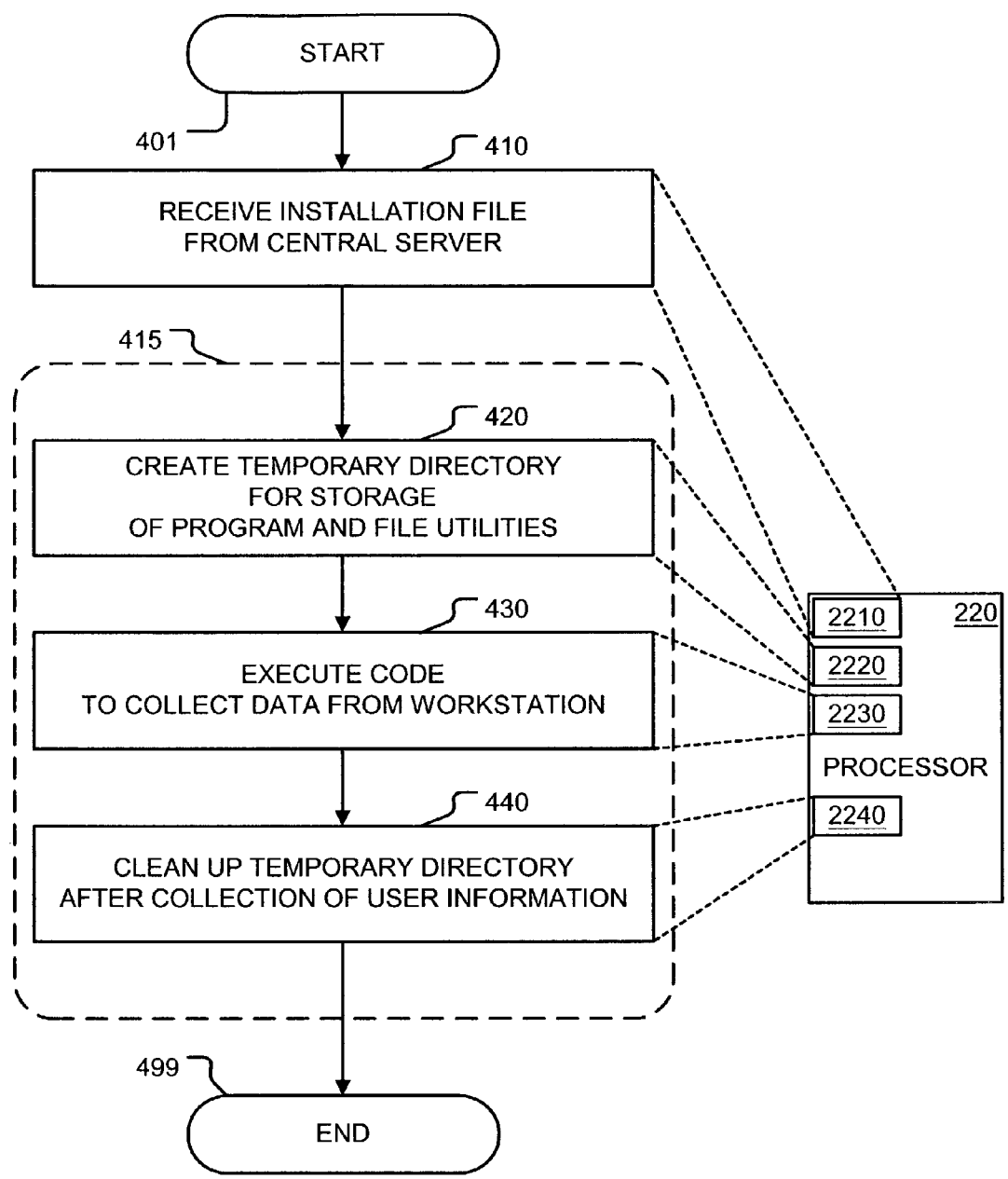
FIG. 4 is a flowchart showing steps performed by various logic components in the processor of the workstation of FIG. 2.

FIG. 4 is a flowchart showing steps performed by various logic components 2210, 2220, 2230, 2240 in the processor 220 of the workstation 120 of FIG. 2. Since, in the embodiment of FIG. 4, the steps of the flowchart are executed by the processor 220, the logic components 2210, 2220, 2230, 2240 may be seen as various programmable segments of the processor 220. In this regard, the program may be stored on a local storage drive 250 and loaded into memory 240 to be executed by the processor 220. Since the process of executing computer code is well known, further discussion of computer code execution is omitted here.

Similarly, while logic components for the steps of FIGS. 5 through 21 may not be explicitly shown, it will be clear to one of ordinary skill in the art that these steps would also be performed by logic components (not shown) in the processor 220. In this regard, the program may be stored on a central server storage drive 350 and loaded into memory 340 to be executed by the processor 320.

As shown in FIG. 4, the processor 220 of the workstation 120 (FIG. 2) receives (410) an installation file from the central server 110 (FIG. 1). In a preferred embodiment, the installation file is downloaded over the Internet. In alternative embodiments, the installation file may be received via email or loaded to the workstation 120 (FIG. 2) from a compact disc (CD) or other recordable media. Since the loading of installation files onto workstations is well known in the art, further discussion of loading installation files is omitted here. In one embodiment, once the installation file is installed on the workstation 120 (FIG. 2), it generates an executable data collection program that may be executed (415) by a user at the workstation 120 (FIG. 2). When the data collection program is executed (415), a temporary directory is created (420), in which program and utility files may be stored. Upon creating (420) the temporary directory, code is executed (430) to collect data from the workstation. Once the code has been executed (430) and data collection is finished, the temporary directory is cleaned up (440) to clear up storage space on the workstation 120 (FIG. 2). In one embodiment, the clean up (440) of the temporary directory includes the deleting of all files except for the executable code that is deleting the files.

Figure 5:
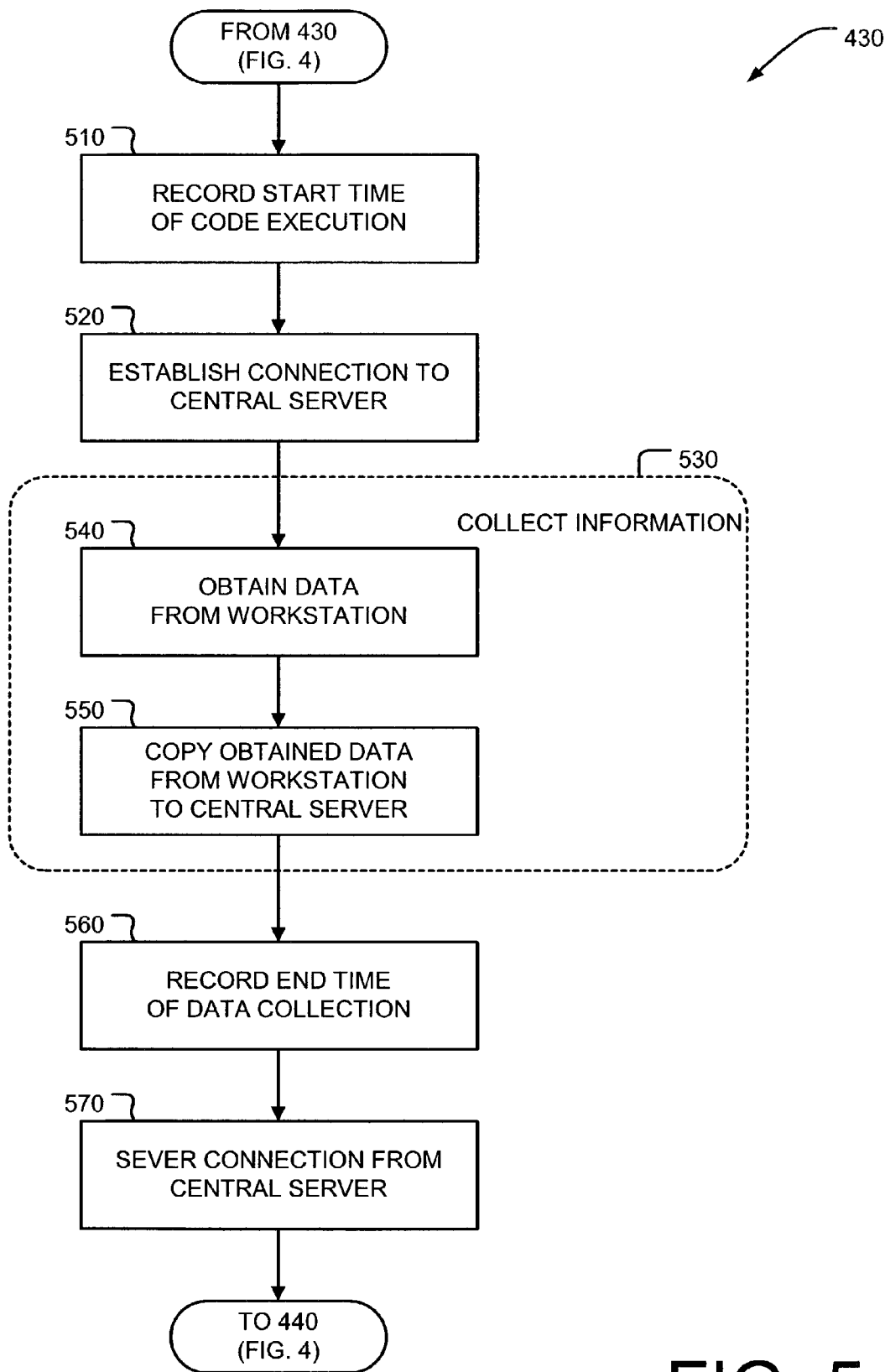
FIG. 5 is a flowchart showing, in greater detail, the step of executing code for data collection shown in FIG. 4.

FIG. 5 is a flowchart showing, in greater detail, the step of executing (430) the code for data collection shown in FIG. 4. As shown in FIG. 5, the executing (430) of the code for data collection begins with recording (510) a start time of the code execution. Once the start time has been recorded (510), a connection is established (520) to the central server 110 (FIG. 1), thereby permitting the workstation 120 (FIG. 1) to communicate with the central server 110 (FIG. 1). In an example embodiment, the workstation 120 (FIG. 1) and the central server 110 (FIG. 1) communicate with each other using a Server Message Block (SMB) protocol over a Transmission Control Protocol/Internet Protocol (TCP/IP) connection. After establishing (520) the connection to the central server 110 (FIG. 1), information is collected (530). The information collecting (530) may conceptually viewed as a process that includes obtaining (540) data from the workstation 120 (FIG. 1) and copying (550) the obtained data from the workstation 120 (FIG. 1) to the central server 110 (FIG. 1). Once all of the information has been collected (530), an end time is recorded (560) and the connection to the central server 110 (FIG. 1) is severed (570).

Figure 6A:
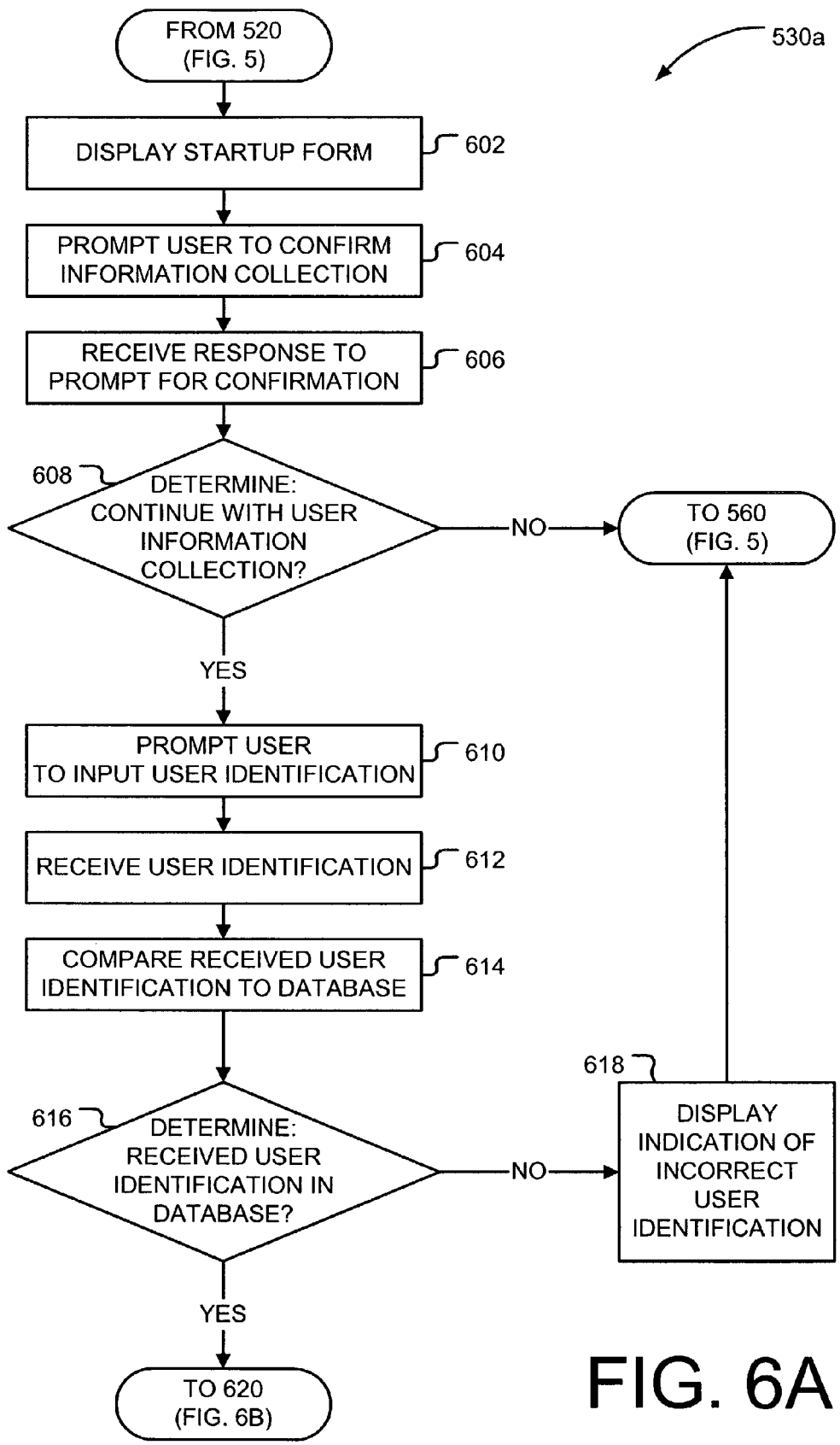
FIGS. 6A through 6C are flowcharts showing, in greater detail, the step of collecting the information shown in FIG. 5.
Figure 6B:
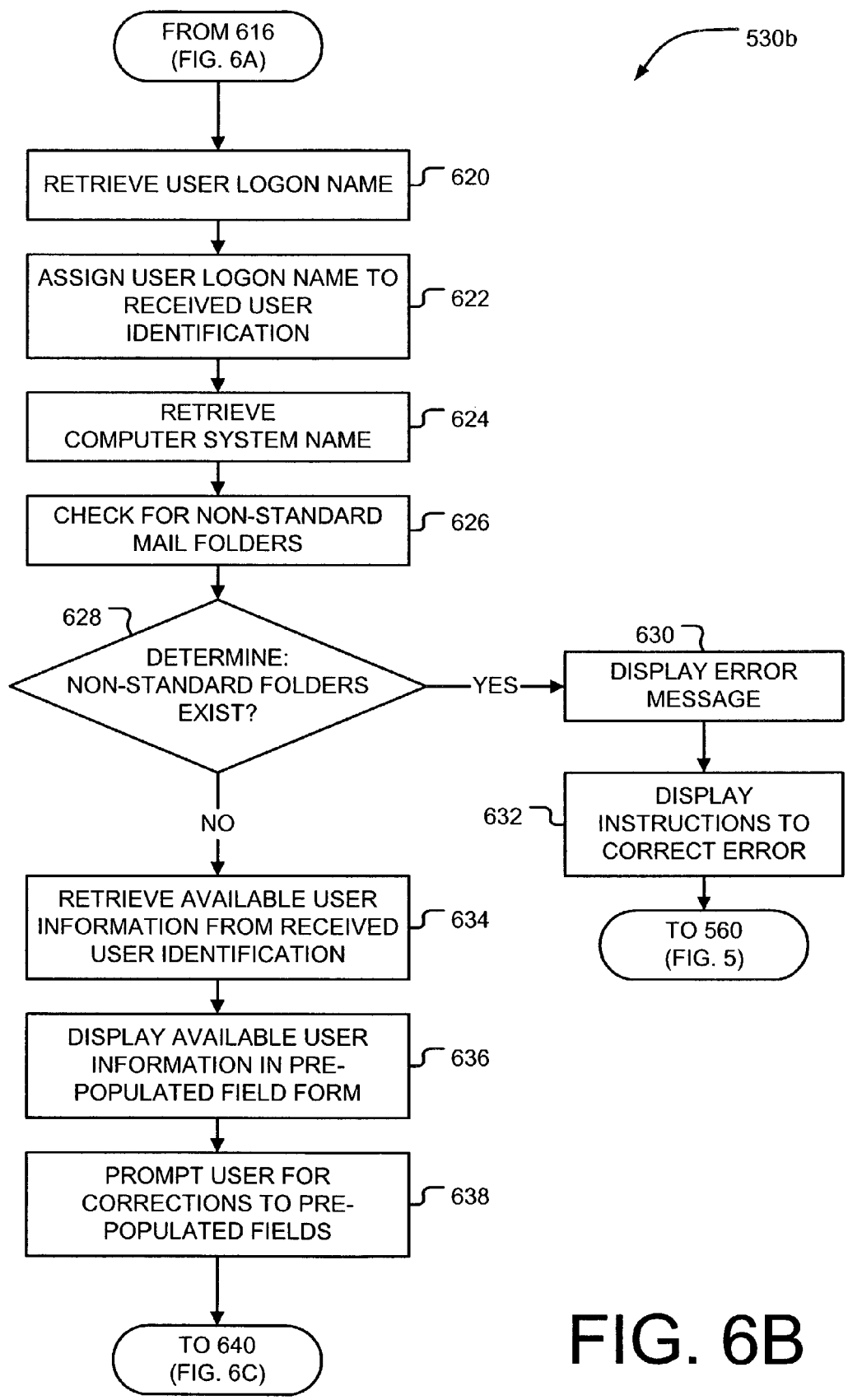
Figure 6C:
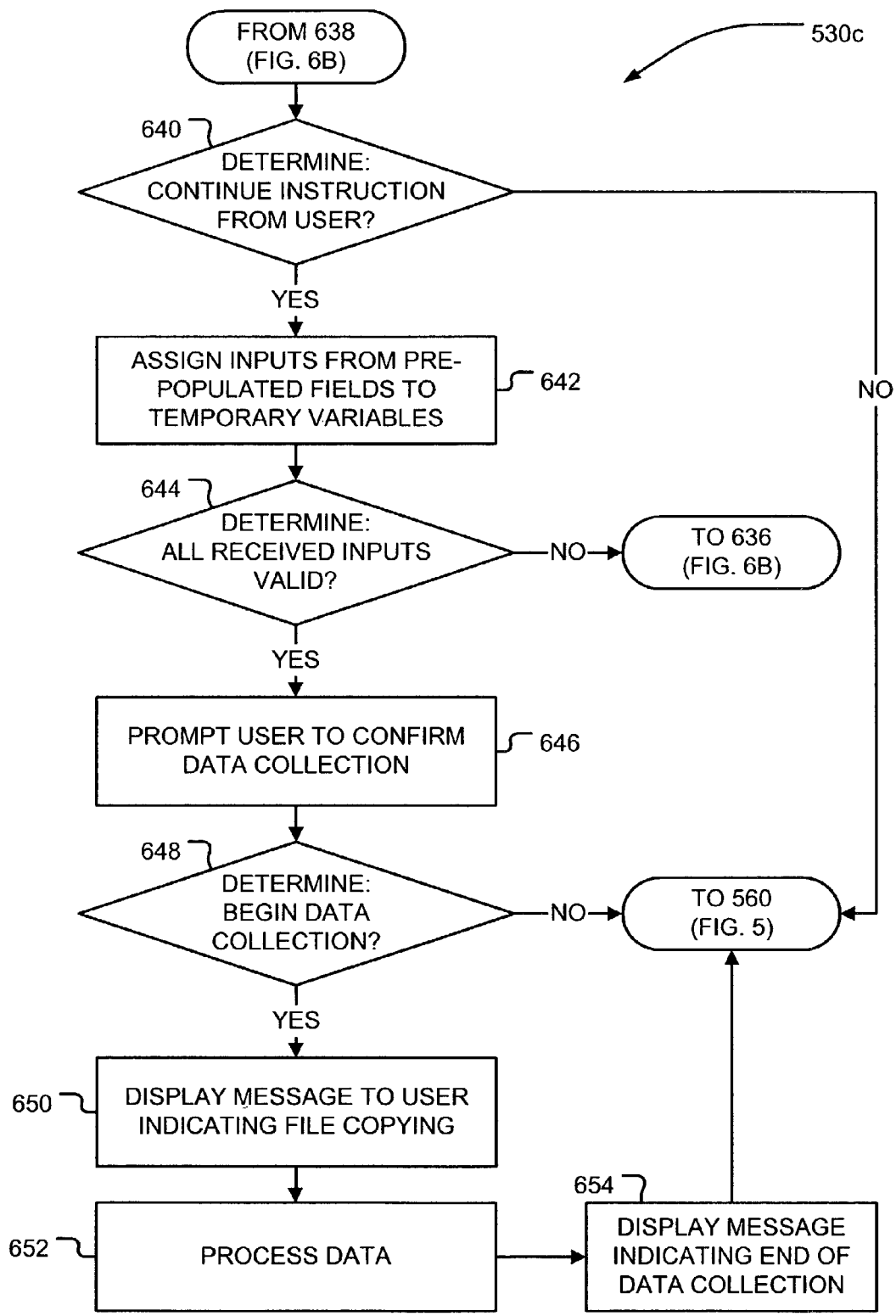

FIGS. 6A through 6C are flowcharts showing, in greater detail, the step of collecting (530) the information shown in FIG. 5. As shown in FIG. 6A, the information collecting (530) begins with a displaying (602) of a startup form (or display or screen) to a user. This startup form prompts (604) the user to confirm whether or not the user would like to proceed with the information collection (530). The workstation 120 (FIG. 1) then receives (606) a response from the user, and determines (608) whether or not the user wishes to continue with the information collection. If it is determined (608) that the user does not wish to continue, then the process exits to the recording (560) of the end time in FIG. 5. If, on the other hand, it is determined (608) that the user wishes to continue with the information collection, then the workstation 120 (FIG. 1) prompts (610) the user to input a user identification, such as, for example, an employee identification number. The user identification is received (612) and, for security purposes, compared (614) to a database. The database may be an employee directory that is stored at a remote location (not shown), which has employee information for each employee. In one embodiment, the database may be stored, updated, and accessed using Lightweight Directory Access Protocol (LDAP). Upon comparing (614) the user identification to the database, it is determined (616) whether or not the user identification is in the database. This provides an added security measure so that information will not be inadvertently collected if the user has not confirmed the collection of such information. If the user identification is not found in the database, then the workstation 120 (FIG. 1) displays (618) an indication to the user that incorrect user identification was entered. If, on the other hand, the user identification is found in the database, then the process continues to FIG. 6B. In an alternative embodiment, the user identification need not be verified, and data may be collected regardless of whether or not the user identification is found in the database. Thus, steps 610 through 618 may be omitted in some embodiments.

As shown in FIG. 6B, upon determining (618) that the user identification is in the database, a user logon name is retrieved (620). The user logon name is assigned (622) to the user identification, and, thereafter, a computer system name is retrieved (624). The workstation 120 (FIG. 1) is then checked (626) for non-standard mail folders or non-standard mail files. In an example embodiment, a standard mail folder may be "C:\OMGUI\OMGUI.DAT" if the email system used at the workstation is OpenMail (a product developed by Hewlett-Packard Co.). In another embodiment, the standard mail files may be ".PST" files if the email system used at the workstation is Outlook (a product of Microsoft Corp.). Upon determining (628) whether or not non-standard folders or files are present on the workstation 120 (FIG. 1), if non-standard folders or files are present, then the workstation 120 (FIG. 1) displays (630) an error message to the user, displays (632) instructions to the user on how to correct the error, and records (560) the end time as shown in FIG. 5. If, on the other hand, non-standard folders or files are not found on the workstation 120 (FIG. 1), then available user information (e.g., street address, phone number, email address, city of residence, state of residence, etc.) is retrieved (634) based on the received user identification. This retrieved (634) user information is displayed (636) in a pre-populated field form, and the user is prompted (638) for any corrections to the pre-populated field form.

The process continues in FIG. 6C where, upon prompting (638) the user, it is determined (640) from the user's response to the prompt whether or not to continue. If it is determined (640) that the user does not wish to continue, then the end time is recorded (560) as shown in FIG. 5. If, however, it is determined (640) that the user wishes to continue, then the inputs from the pre-populated fields are assigned (642) to temporary variables. Upon assigning (642) the pre-populated fields to the temporary variables, it is determined (644) whether or not all the received inputs are valid. The validity of the inputs is determined by the executable data collection program according to a set of predefined rules coded within the program. If all of the received inputs are not valid, then the process returns to the display (636) of the available user information in the pre-populated field form as shown in FIG. 6B. In one embodiment, the pre-populated field for the invalid input is highlighted for the user. In another embodiment, the pre-populated field may be cleared for the invalid input. If, on the other hand, all of the received inputs are valid, then the user is prompted (646) to confirm the data collection, and it is again determined (648) whether or not to begin collecting data. If the user has indicated that data collection should not proceed, then the end time is recorded (560) as shown in FIG. 5. If, however, the user has confirmed the collection of data, then a message is displayed (650) to the user, which indicates that files are being copied. Upon displaying (650) the message to the user, data is processed (652). In other words, upon displaying (650) the message to the user, the workstation 120 (FIG. 1) begins collecting relevant data and processing the data. In one embodiment, the relevant data includes all documents, spreadsheets, drawings, etc. Thus, in one embodiment, relevant data is collected by retrieving files having extensions such as, for example, ".doc," ".xls," ".vsd," ".vst," ".ppt," ".txt," ".pdf," ".pst," ".msg," ".zip," etc. The data collecting is discussed in greater detail below. Once the data processing (652) is complete, a message is displayed (654) to the user, which indicates that the data collection has ended. The end time is then recorded (560) as shown in FIG. 5.

Figure 7:
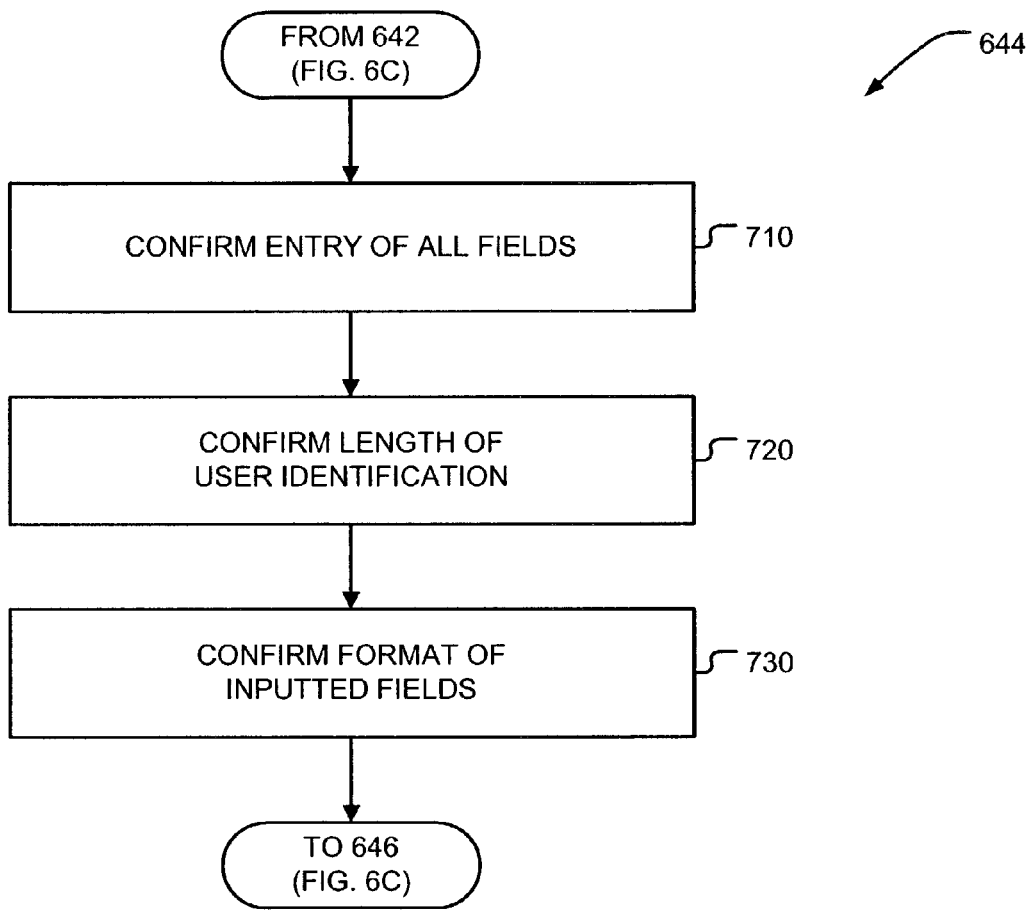
FIG. 7 is a flowchart showing, in greater detail, the step of determining whether all received inputs are valid, which is shown in FIG. 6C.

FIG. 7 is a flowchart showing, in greater detail, the step of determining (644) whether all received inputs are valid shown in FIG. 6C. As shown in FIG. 7, the determining (644) begins with confirming (710) that all fields have been entered. In one embodiment, each employee or user has a unique user identification, which has a predetermined number of characters. Thus, in one embodiment, once the entry of all fields has been confirmed (710), the length of the user identification is further confirmed (720) in case the user has altered the user identification. In addition to confirming (710) that all fields have been entered and confirming (720) that the length of the user identification is correct, the format of the inputted fields is also confirmed (730). For example, if zip code is one of the input fields, the data collection program confirms (720) that the entered zip code is five characters in length, and that all of the characters are numeric. The confirming (720) of the format is discussed in greater detail below.

Figure 8:
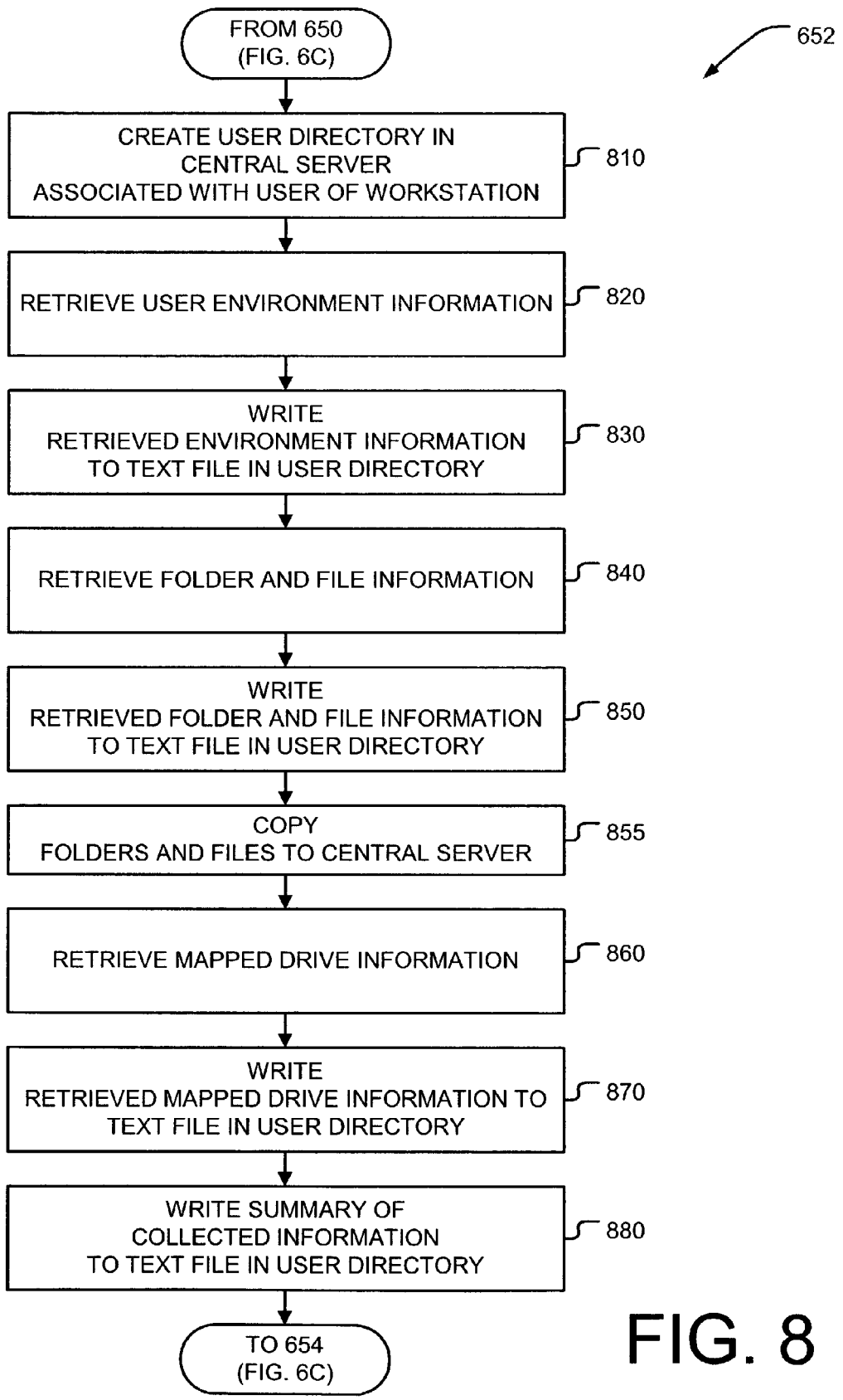
FIG. 8 is a flowchart showing, in greater detail, the step of processing data shown in FIG. 6C.

FIG. 8 is a flowchart showing, in greater detail, the step of processing (652) data shown in FIG. 6C. As described above, the data processing (652) includes the collection of relevant information such as files having extensions such as, for example, ".doc," ".xls," ".vsd," ".vst," ".ppt," ".txt," ".pdf," ".pst," ".msg," ".zip," etc. As such, the data processing (652) begins with a creation (810) of a user directory at the central server 110 (FIG. 1) by the data collection program executing at the workstation. The user directory is associated with the user of the workstation. In this regard, the user directory is somehow identified with the user of the workstation. As will be described below, in an example embodiment, the user directory is correlated with the received (and confirmed) user identification. Upon creating (810) a user directory in the central server 110 (FIG. 1), user environment information is retrieved (820) from the workstation 120 (FIG. 1), and this information is written (830) to a text file in the user directory. The environment information may include operating system, version, hardware type, etc. Additionally, folder and file information is retrieved (840), and this information is written (850) to a text file in the user directory. The folder and file information may include a directory tree structure, names of files, etc. In one embodiment, the folder and file information may be written to the same text file as the text file for the user environment information. In another embodiment, the folder and file information may be written to a different text file than the text file for the user environment information. Upon writing (850) the folder and file information, the actual folders and files on the workstation 120 (FIG. 1) are copied (855) to the central server 110 (FIG. 1). In addition to the user environment information and the folder and file information, information related to mapped drives (e.g., drives that are accessible from the workstation 120) is retrieved (860), and the mapped drive information is written (870) to a text file in the user directory. Again, this information may be written (870) to a separate text file, or, alternatively, may be concatenated with the environment or file and folder information. Upon writing the mapped drive information, the folder and file information, and the user environment information, a summary of the collected information is written (880) to a text file in the user directory. Again, this text file may be a separate file, or, alternatively, may be a preexisting file in the user directory. The summary provides an overview of all the data that was collected by the data collection program. In this regard, the summary may be viewed as an index of all the collected data.

Figure 9:
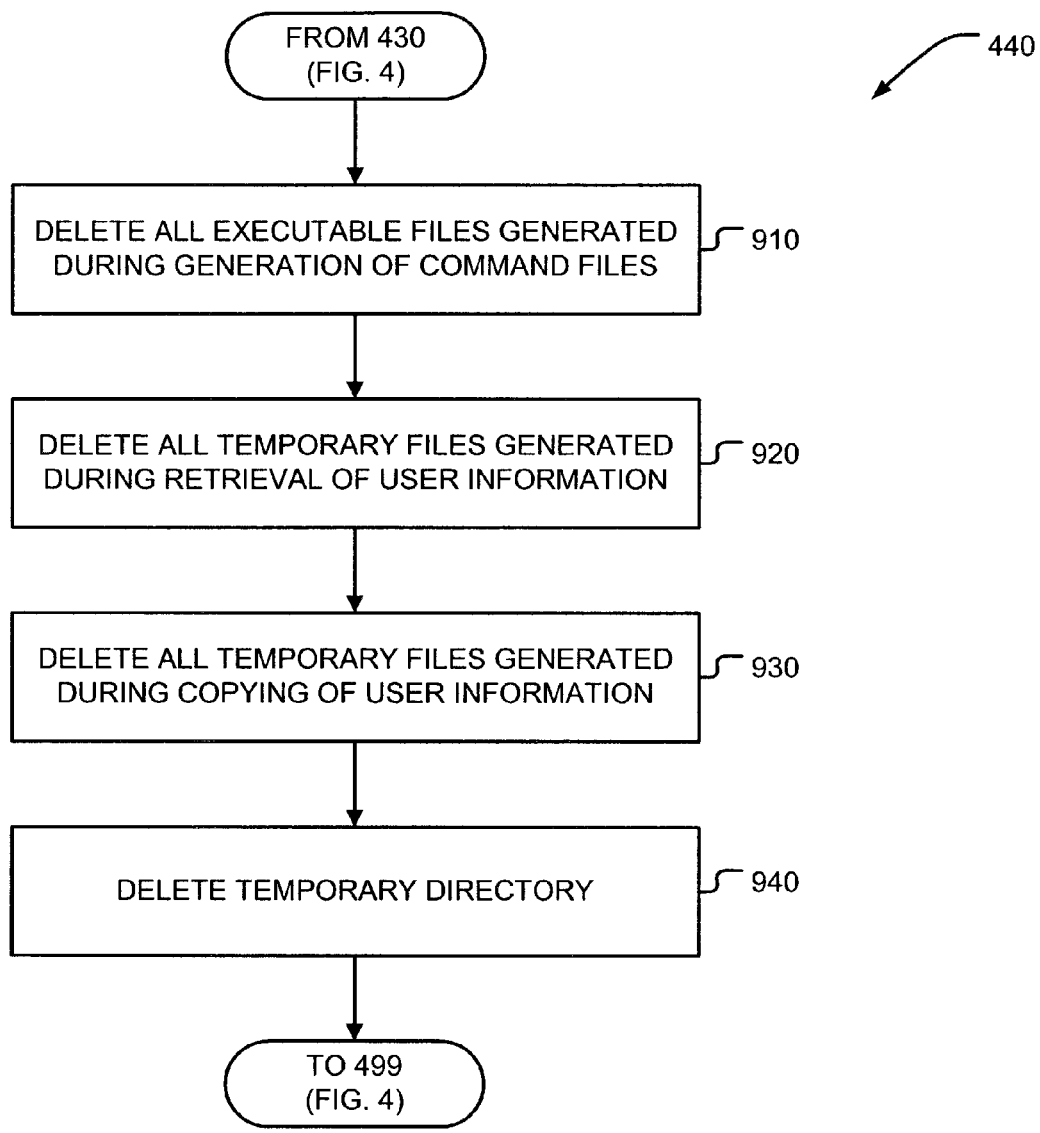
FIG. 9 is a flowchart showing, in greater detail, the step of cleaning up the temporary directory shown in FIG. 4.

FIG. 9 is a flowchart showing, in greater detail, the step of cleaning up (440) the temporary directory shown in FIG. 4. As shown in FIG. 9, the process of cleaning up (440) begins with deleting (910) all executable files generated during the installation. Additionally, the cleaning up (440) includes deleting (920) any temporary files that may have been generated during the retrieval of user information, and the deleting (930) of any temporary files that may have been generated during the copying of user information. For example, a temporary file may be created at the workstation to store user information, rather than writing the user information piece-by-piece to the central server. Similarly, for example, directory tree structure and a list of files may be written to a temporary file and transmitted to the central server. The only file not deleted is the executable code that is currently running in order to delete file, since a program cannot typically delete itself while it is running Once these files have been deleted (920, 930), the temporary directory is deleted (940), thereby freeing up space on the workstation 120 (FIG. 1), which was formerly occupied by the data collection program and files related to the execution of the data collection program.

As seen from the flowcharts of FIGS. 4 through 9, a simpler and less laborious approach to collecting information is provided. While a general process is outlined in FIGS. 4 through 9, this process may be written in computer-readable code, which may be adapted to execute the steps outlined in FIGS. 4 through 9. FIGS. 10A through 15E are flowcharts that show execution of a specific computer code, which substantially carries out the general steps outlined in FIGS. 4 through 9. While specific subroutines are described below, it will be clear to one of ordinary skill in the art that modifications may be made to the code to perform equivalent functions without departing from the scope of the invention.

FIGS. 10A through 10E are flowcharts showing steps associated with one embodiment of the method in a specific computer program adapted to gather information in a legal discovery process. As such, the running of the computer program (hereinafter simply referred to as "the program") begins in FIG. 10A with downloading (1002) a filecopy of a utility from a web server into a temporary directory. Upon downloading (1002) the filecopy of the utility, a start time is recorded (1004) and a central server path is set (1006). The central server path is provided within the data collection program and indicates the path to which user information is to be written, and the path to which files and folders are to be copied. Case-specific folder names are set (1008), and a greeting form is populated (1010) with a program information message. Thereafter, the central server 110 (FIG. 1) is mapped (1012) and a startup form is displayed (1014), which prompts a user for input on whether or not to continue. In one embodiment, the mapping (1012) of the central server may be a mounting of the set (1006) path as a network drive. Since mounting of network drives is well known in the art, further discussion of mounting network drives is omitted here. Upon receiving the user input, the program determines (1015) whether or not the process should continue. If the user has indicated to the program that the process should not continue (i.e., indicated that no data should be collected), then the program continues to FIG. 10B. If, on the other hand, the user has indicated to the program that the process may continue (i.e., indicated that data collection is permitted), then the program continues to FIG. 10C.

Figure 10A:
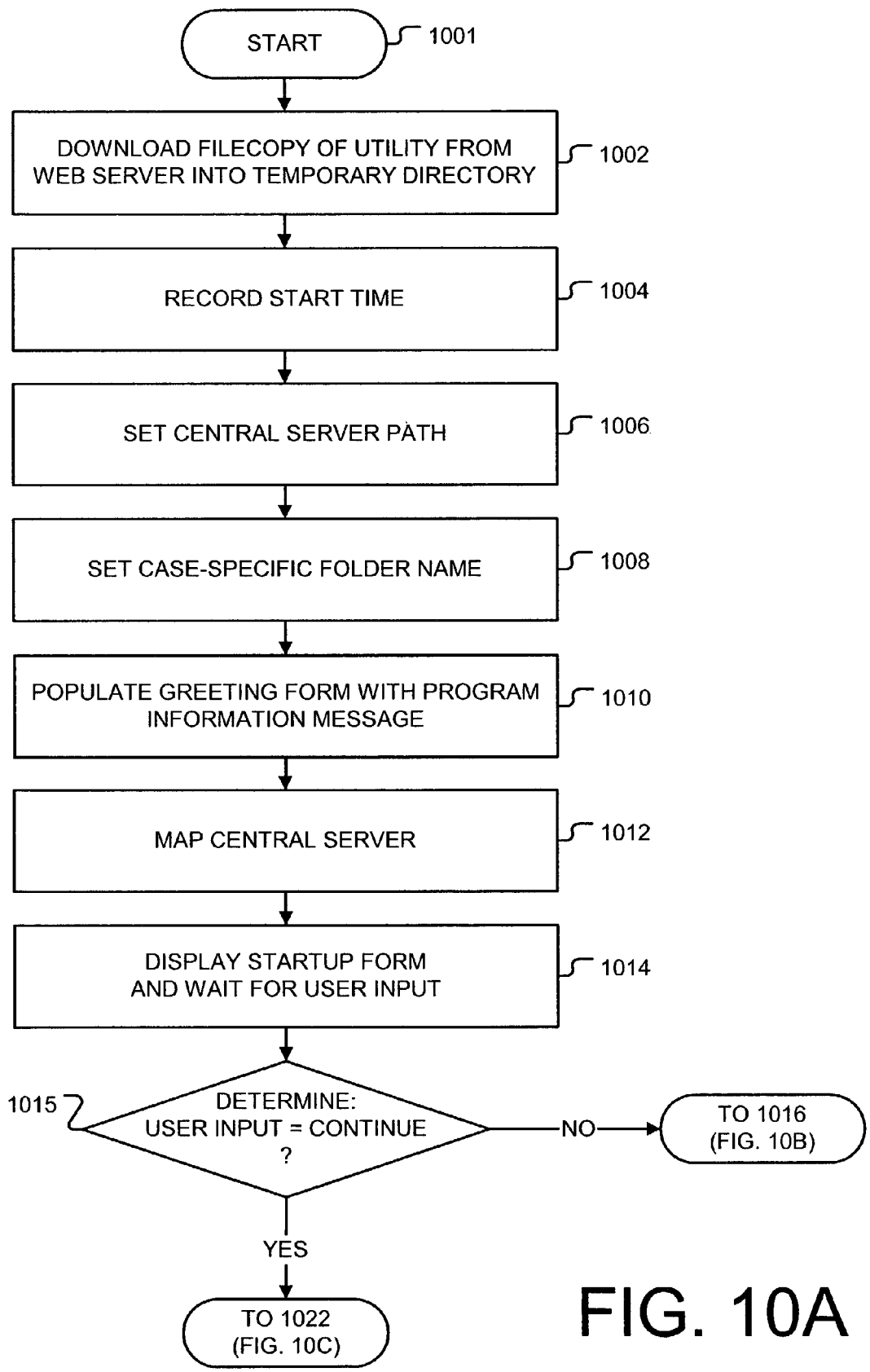
FIGS. 10A through 10E are flowcharts showing steps associated with one embodiment of the method in a specific computer program adapted to gather information in a legal discovery process.
Figure 10B:
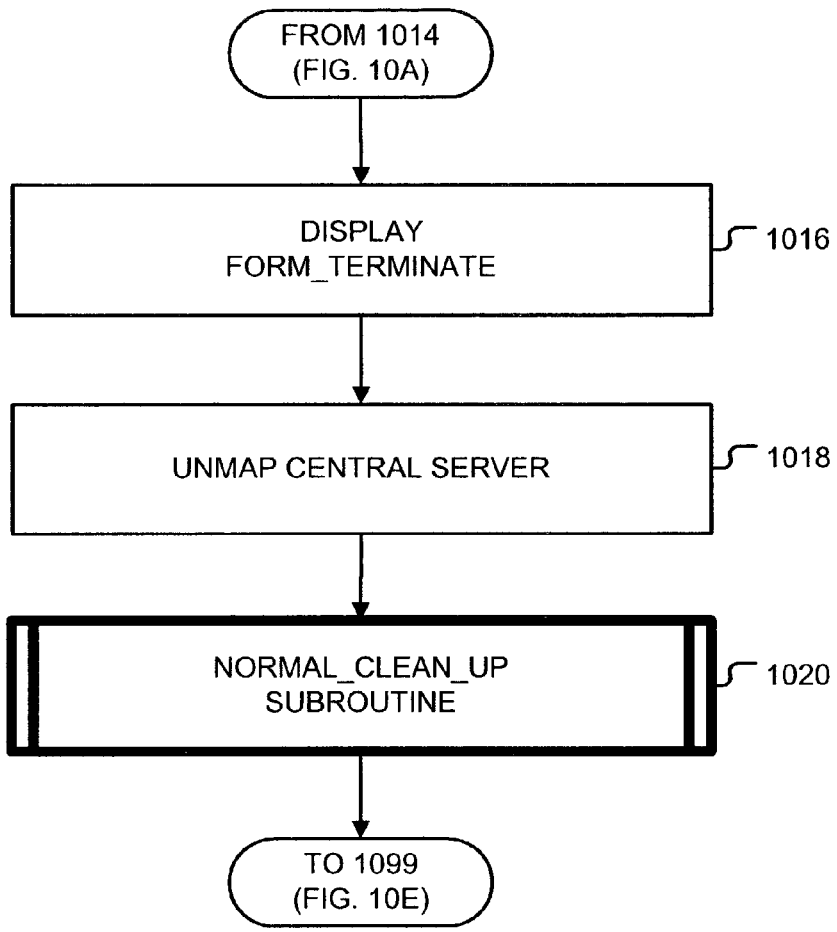

As shown in FIG. 10B, if the user has disapproved the collection of data, then a FORM_TERMINATE form is displayed (1016) to the user, which indicates that the program will now terminate. Upon displaying (1016) the FORM_TERMINATE form, the central server 110 (FIG. 1) is unmapped (1018), a NORMAL_CLEAN_UP subroutine is called (1020), which cleans up the disk space, and the program is terminated (1099).

Figure 10C:
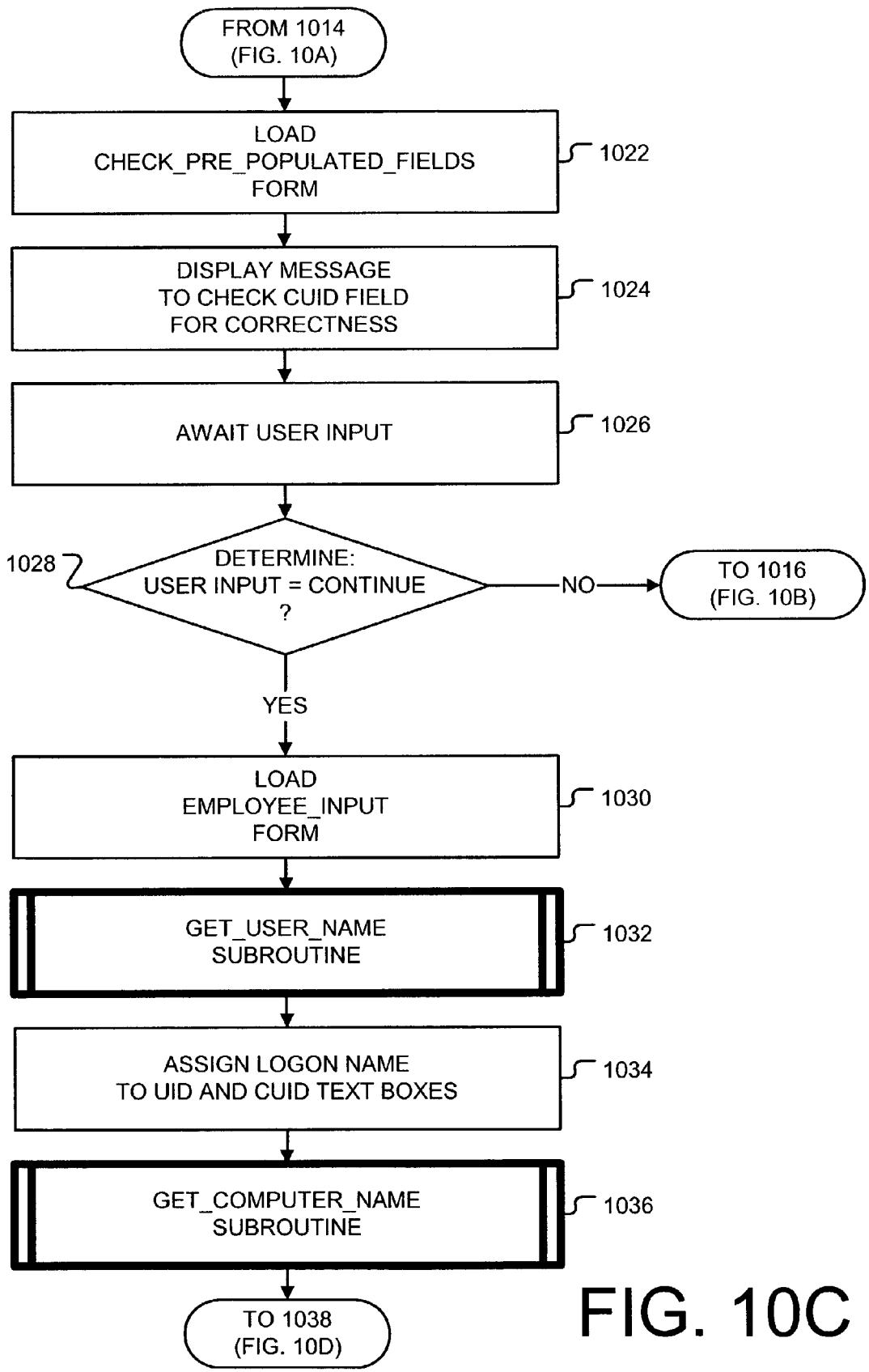

As shown in FIG. 10C, if the user has approved the collection of data, then a CHECK_PRE_POPULATED_FIELDS form is loaded (1022), and a message is displayed (1024) to the user to check common user identification (CUID) field for correctness. The CHECK_PRE_POPULATED_FIELDS form prompts the user to check the fields for correctness. A CUID may be a unique identification number that is assigned to each employee or user. At this point, the program awaits (1026) input from the user. Upon receiving the user input, the program determines (1028) whether or not the process should continue. If the program determines (1028) that the process should not continue, then the program proceeds with the steps outlined in FIG. 10B. If, on the other hand, the program determines (1028) that the user has approved the continuation of the process, then the program loads (1030) EMPLOYEE_INPUT form, and calls (1032) a GET_USER_NAME subroutine to get the user logon name from the registry of the workstation 120 (FIG. 1). After calling (1032) the GET_USER_NAME subroutine, the program assigns (1034) the logon name to a user identification (UID) and the CUID text boxes. A GET_COMPUTER_NAME subroutine is then called (1036) to get the computer name from the registry of the workstation 120 (FIG. 1), and the program continues to FIG. 10D. In an example embodiment the logon name is assigned by a systems administrator to a user so that the user may log onto a workstation using the assigned logon name. In this regard, the logon name may subsequently be used to determine application servers (not shown) that may have been accessed by the user. Similarly, in one embodiment, the computer name is assigned to a particular workstation 120 (FIG. 1) by the systems administrator so that each workstation 120 (FIG. 1) on a particular network will have a unique computer name. Thus, if a user has access to multiple workstations, the computer name indicates which of the multiple workstations is the source of the collected information.

Figure 10D:
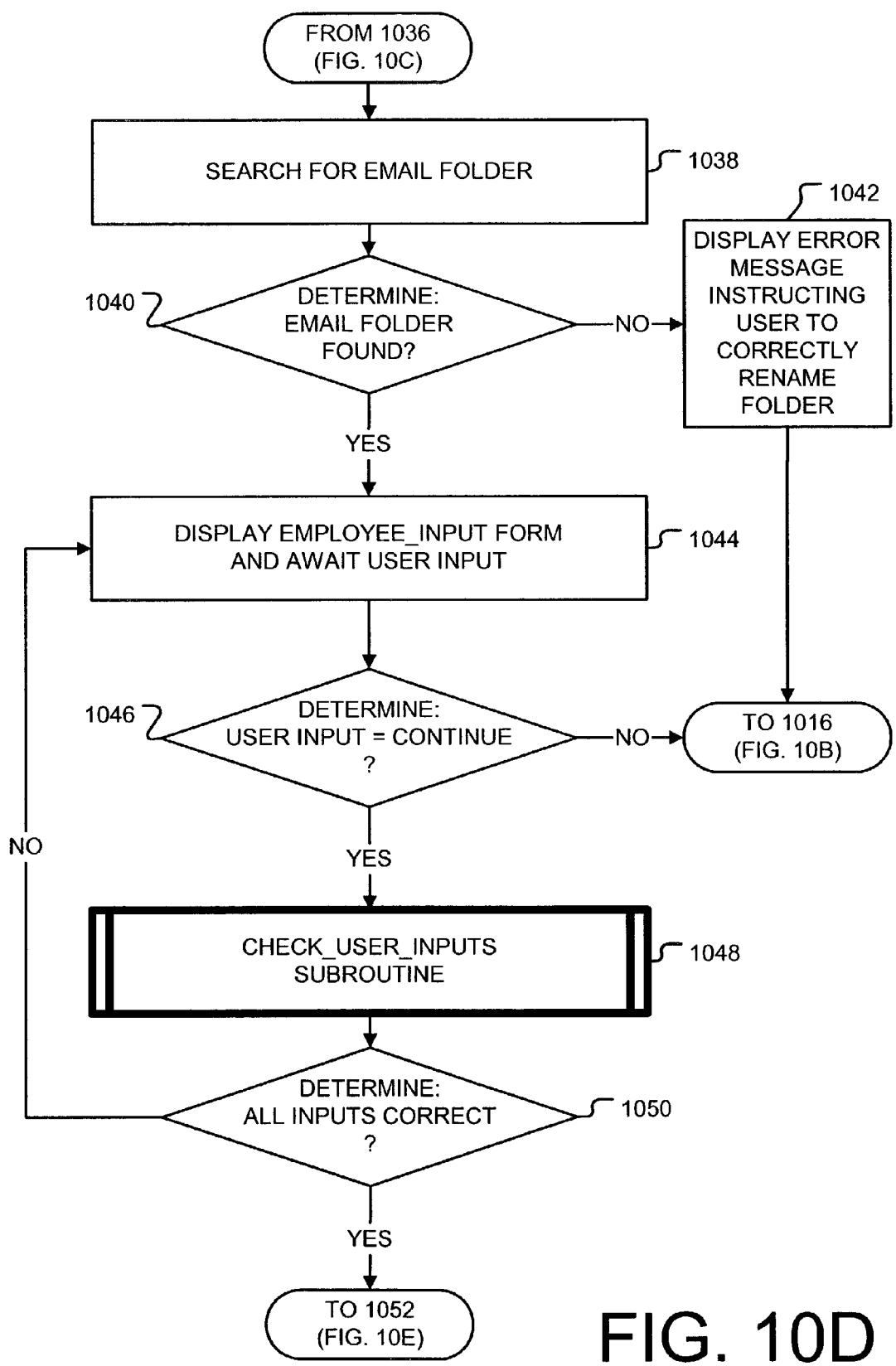

As shown in FIG. 10D, after calling (1036) the GET_COMPUTER_NAME subroutine, the program searches (1038) for email folders (e.g., "\OMGUI\OMGUI.DAT" for OpenMail (a product of Hewlett-Packard Co.)), and determines (1040) whether or not an email folder is found. If the program determines (1040) that no email folder is found, then the program displays (1042) an error message instructing the user to correctly rename an email folder. In another embodiment, the program may search for email files (e.g., ".PST" files for Outlook (a product of Microsoft Corp.)), and determine whether or not the email files are found.

Upon displaying (1042) the error message, the program continues to the process outlined in FIG. 10B. If, on the other hand, the program determines (1040) that an email folder is found, then the program displays (1044) an EMPLOYEE_INPUT form and awaits input from the user. The EMPLOYEE_INPUT form is configured to receive any changes made by the user to fields in the pre-populated fields form. In this regard, the input from the user may include one or more changes to the pre-populated fields form. Additionally, the input from the user includes an indication to continue (e.g., a mouse click on a "continue" button (not shown) that may be displayed to the user) or an indication to abort (e.g., a mouse click on an "abort" button (not shown) that may be displayed to the user). When the program receives the input from the user, it again determines (1046) whether or not to continue. If the program determines that the user does not wish to continue with the data collection (e.g., selecting of an "abort" button), then the program proceeds with the process outlined in FIG. 10B. If, on the other hand, the program determines that the user wishes to continue with the data collection (e.g., selecting of a "continue" button), then the program calls (1048) a CHECK_USER_INPUTS subroutine, which determines (1050) whether or not all inputs are correct. This is shown in greater detail with reference to FIGS. 14A through 14F. If the program determines (1050) that all inputs are not correct, then the program loops back to the displaying (1044) of the EMPLOYEE_INPUT form and awaits input (e.g., changes or corrections) from the user. If, on the other hand, the program determines (1050) that all inputs are correct, then the program continues to FIG. 10E.

Figure 10E:
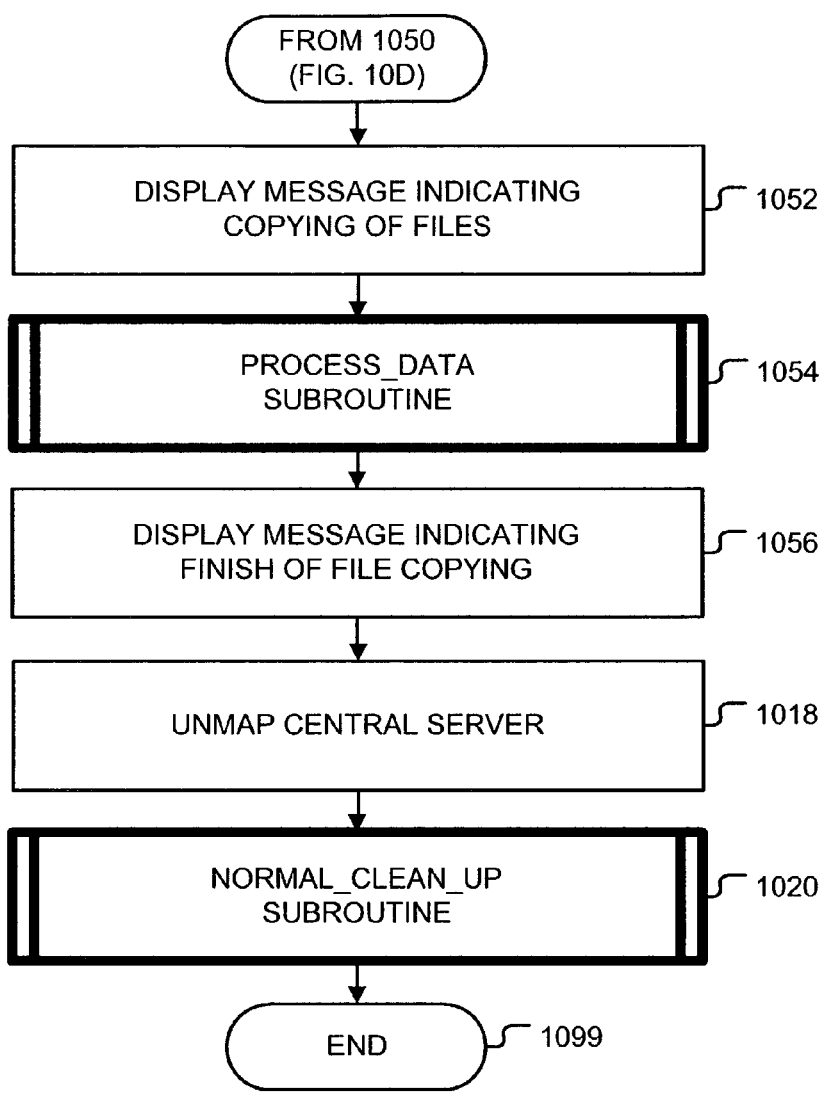

As shown in FIG. 10E, upon determining (1050) that all user inputs are correct, the program displays (1052) a message to the user, which indicates that files are now being copied. Upon displaying (1052) the message, the program calls (1054) a PROCESS_DATA subroutine, which collects and processes relevant user and workstation 120 (FIG. 1) information. The processing of the relevant user and workstation 120 (FIG. 1) information includes copying of files from the workstation to the central server, and also includes the writing of files having workstation information and user information to the central server. Once the PROCESS_DATA subroutine has finished, the program displays (1056) a message indicating that it has finished copying files. Thereafter, the program unmaps (1018) the central server 110 (FIG. 1) and calls (1020) a NORMAL_CLEAN_UP subroutine.

Figure 11:
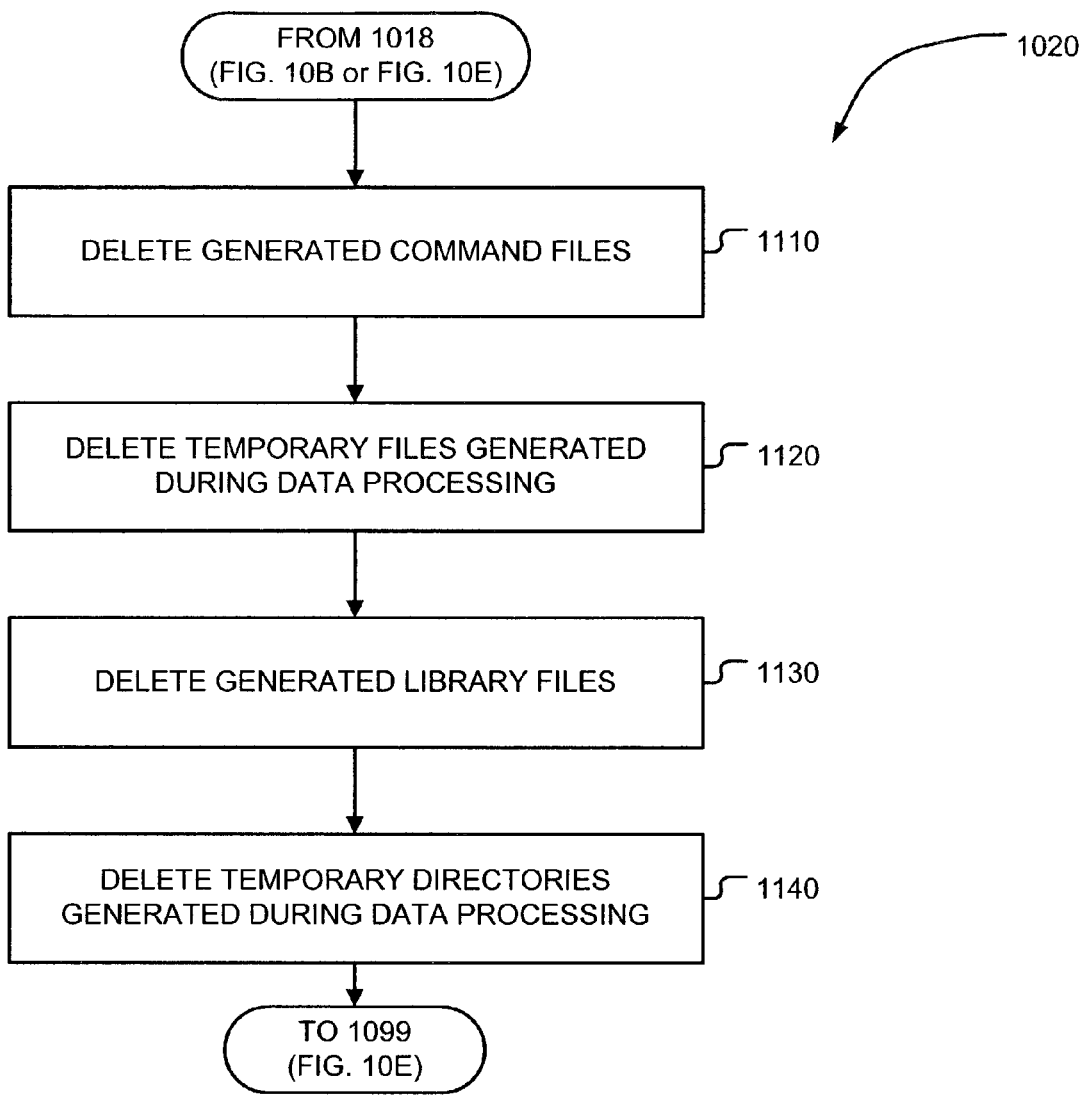
FIG. 11 is a flowchart showing, in greater detail, the NORMAL_CLEAN_UP subroutine shown in FIGS. 10B and 10E.

FIG. 11 is a flowchart showing, in greater detail, the NORMAL_CLEAN_UP subroutine shown in FIGS. 10B and 10E. As shown in FIG. 11, the NORMAL_CLEAN_UP subroutine begins with deleting (1110) the generated command files. Additionally, the NORMAL_CLEAN_UP subroutine deletes (1120) temporary files that were generated during the PROCESS_DATA subroutine, and also deletes (1130) library files that may have been generated during the program (i.e., the running of the computer program). Once all of these files have been deleted 1110, 1120, 1130, the NORMAL_CLEAN_UP subroutine deletes (1140) any temporary directories that may have been generated during the data processing.

Figure 12:
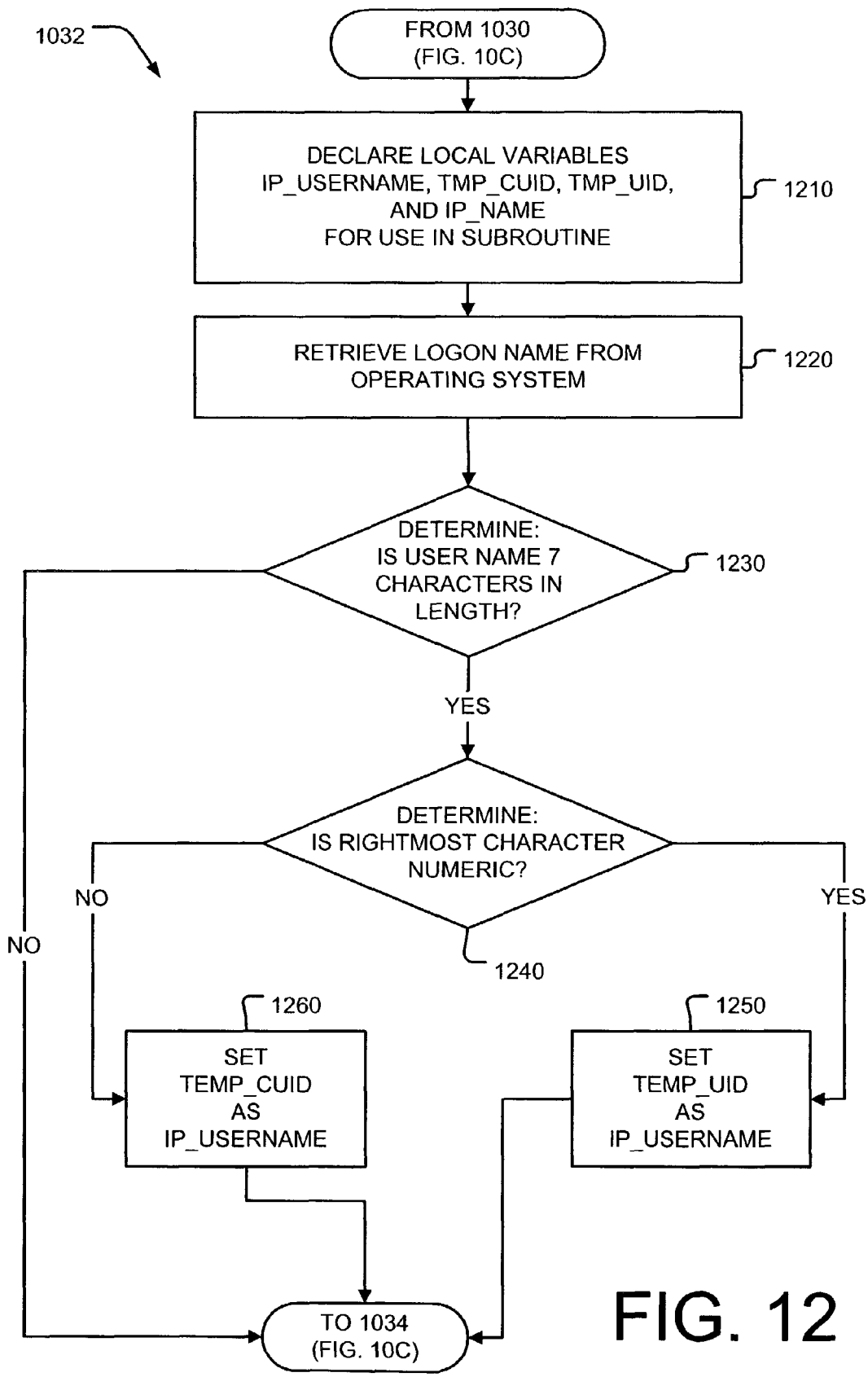
FIG. 12 is a flowchart showing, in greater detail, the GET_USER_NAME subroutine shown in FIG. 10C.

FIG. 12 is a flowchart showing, in greater detail, the GET_USER_NAME subroutine shown in FIG. 10C. As discussed above, the user's logon name may subsequently be used to determine other application servers (not shown) that may have been accessed by the user. As shown in FIG. 12, the GET_USER_NAME subroutine begins by declaring (1210) local variables IP_USERNAME, TMP_CUID, TMP_UID, and IP_NAME for use in the GET_USER_NAME subroutine. Once these local variables have been declared (1210), the GET_USER_NAME subroutine retrieves (1220) the user's logon name from the environment variables on the workstation.

Figure 13:
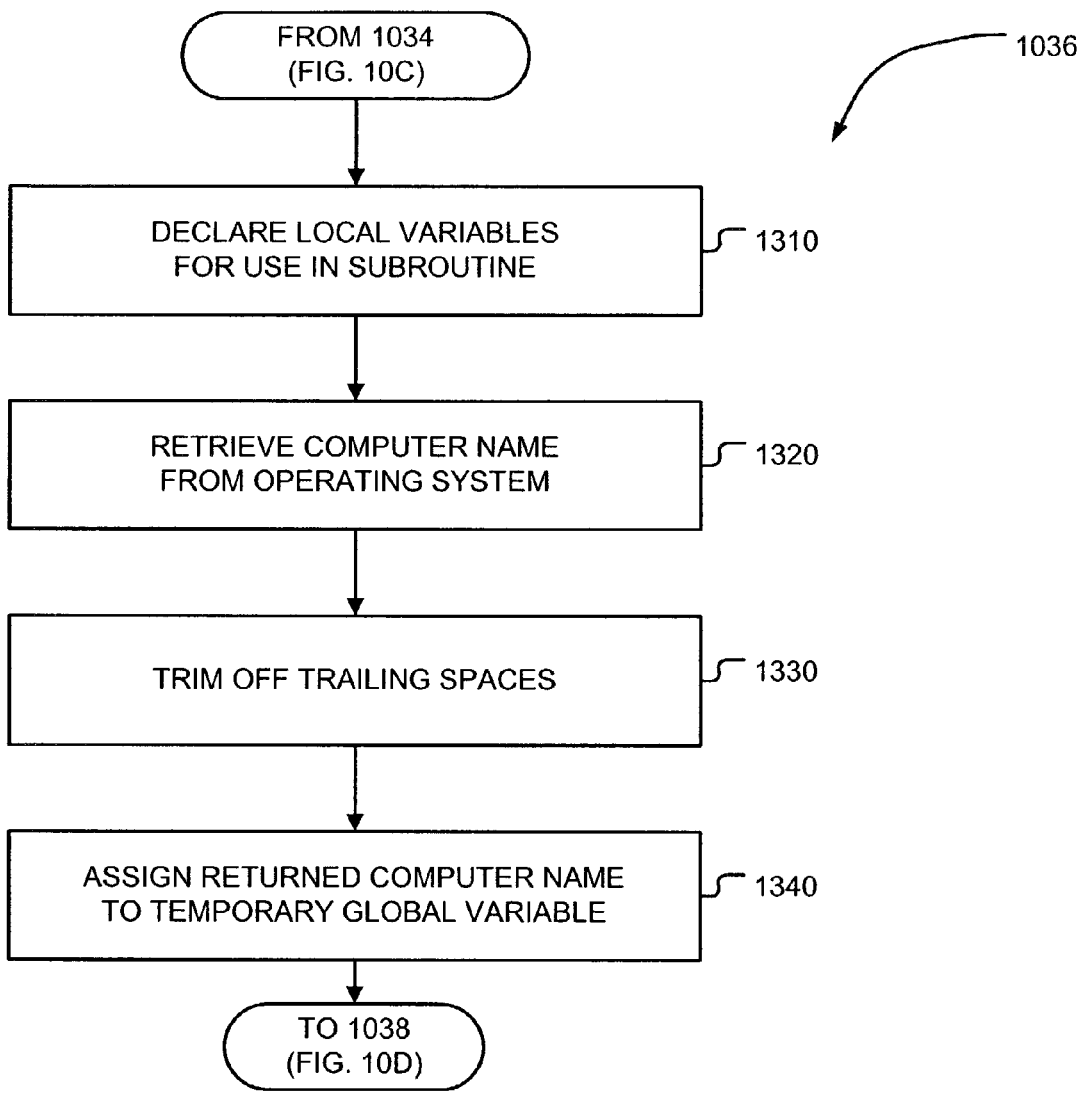
FIG. 13 is a flowchart showing, in greater detail, the GET_COMPUTER_NAME subroutine shown in FIG. 10C.

FIG. 13 is a flowchart showing, in greater detail, the GET_COMPUTER_NAME subroutine shown in FIG. 10C. As discussed above, since the user may have access to multiple workstations, it may be desirable to determine which of the multiple workstations is the origin of the user information. As shown in FIG. 13, the GET_COMPUTER_NAME subroutine begins by declaring (1310) local variables for use in the GET_COMPUTER_NAME subroutine. Upon declaring (1310) the local variables, the GET_COMPUTER_NAME subroutine retrieves (1320) a computer name from the environment variables and trims off (1330) trailing spaces from the computer name. The returned computer name is then assigned (1340) to a temporary global variable, and the GET_COMPUTER_NAME subroutine exits.

Figure 14A:
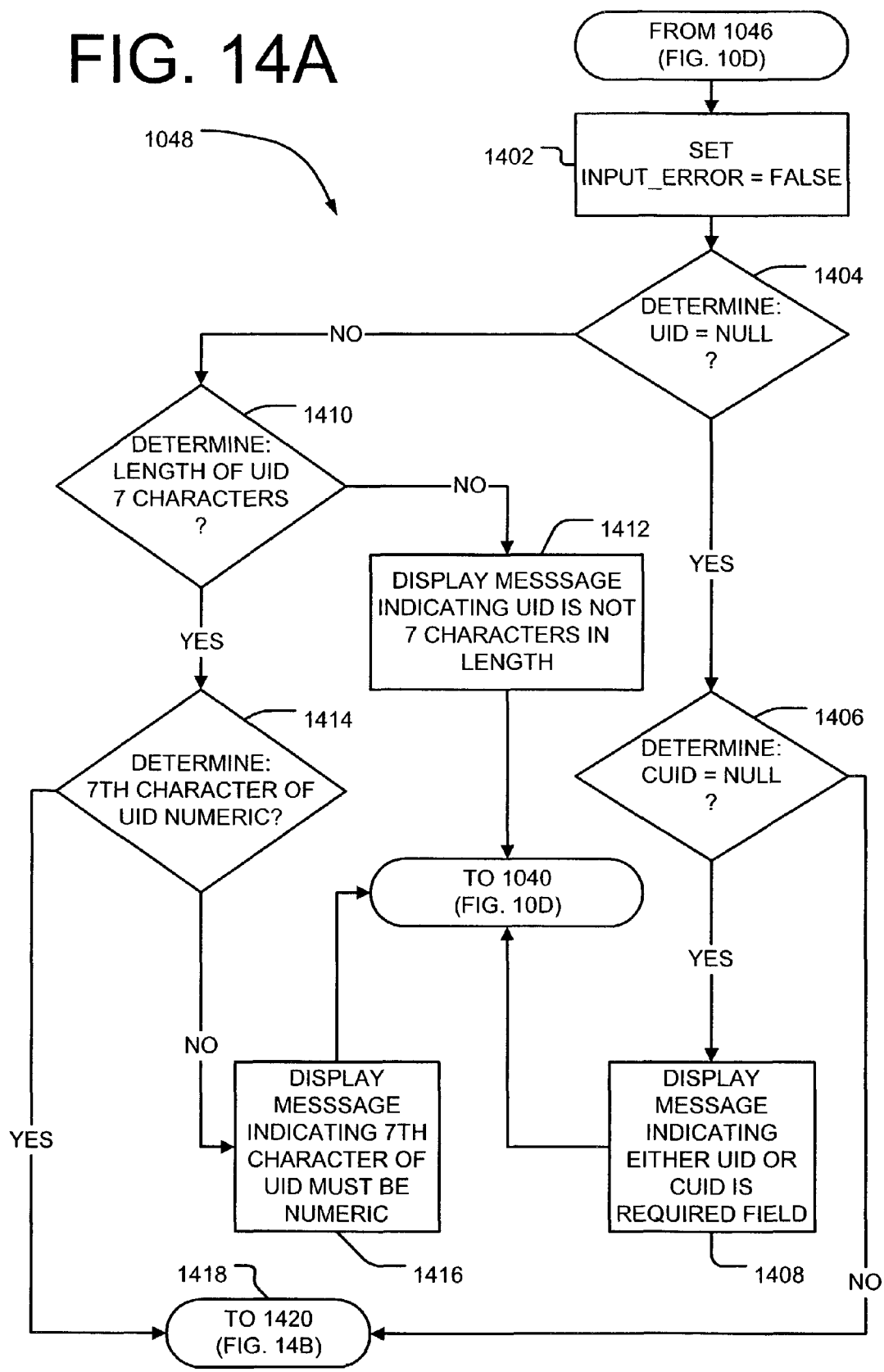

FIGS. 14A through 14F are flowcharts showing, in greater detail, the CHECK_USER_INPUTS subroutine shown in FIG. 10D. While a specific embodiment is shown in FIGS. 14A through 14F using specific examples of user information, it should be understood that the data collection program may be modified to retrieve less information or even different information as needed. As shown in FIG. 14A, the CHECK_USER_INPUTS subroutine begins by setting (1402) INPUT_ERROR to FALSE, thereby initializing the variable INPUT_ERROR to indicate that, so far, no error exists in the user inputs. Upon initializing the INPUT_ERROR variable, the CHECK_USER_INPUTS subroutine determines (1404) whether or not UID is NULL (i.e., whether or not the variable UID has a value). If the CHECK_USER_INPUTS subroutine determines (1404) that UID is NULL, then it further determines (1406) whether or not CUID is NULL (i.e., whether or not the variable CUID has a value). If the CHECK_USER_INPUTS subroutine determines (1406) that CUID is NULL, then the CHECK_USER_INPUTS subroutine displays (1408) a message indicating that either UID or CUID is a required field, and that the user must enter one of those fields. Upon displaying (1408) the message, the CHECK_USER_INPUTS subroutine exits to obtain either the UID or the CUID or both.

If the CHECK_USER_INPUTS subroutine determines (1404) that UID is not NULL, then the CHECK_USER_INPUTS subroutine determines (1410) whether or not UID is seven characters in length. If the CHECK_USER_INPUTS subroutine determines (1410) that the UID is not seven characters in length, then the CHECK_USER_INPUTS subroutine displays (1412) a message indicating that the UID is not seven characters in length, and subsequently exists the subroutine to obtain a proper UID. If, on the other hand, the CHECK_USER_INPUTS subroutine determines (1410) that the UID is seven characters in length, then the CHECK_USER_INPUTS subroutine further determines (1414) whether or not the seventh character of the UID is numeric. If the CHECK_USER_INPUTS subroutine determines (1414) that the seventh character of the UID is not numeric, then the CHECK_USER_INPUTS subroutine displays (1416) a message indicating that the seventh character of the UID must be numeric, and subsequently exits the subroutine to obtain a proper UID.

Figure 14B:
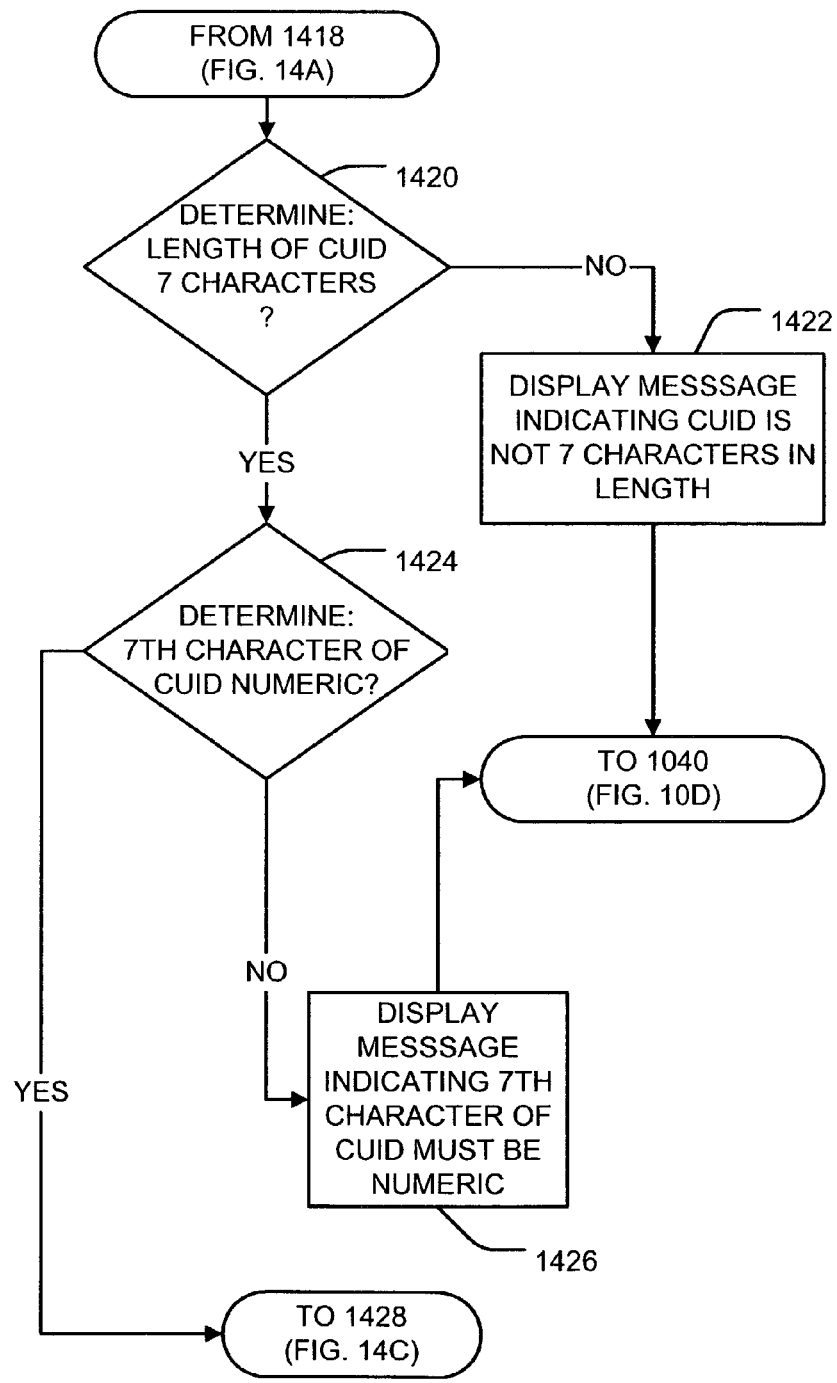

If the CHECK_USER_INPUTS subroutine determines (1414) that the seventh character of the UID is numeric or determines (1406) that CUID is not NULL, then the CHECK_USER_INPUTS subroutine continues to FIG. 14B.

In the specific embodiment of FIGS. 14A through 14F, a system is shown in which a seven-character CUID having a numeric seventh character is assigned to each user. It will, however, be understood that the format of the CUID may be different depending on the specific format used by different companies. As shown in FIG. 14B, the CHECK_USER_INPUTS subroutine determines (1420) whether or not the CUID is seven characters in length. If the CHECK_USER_INPUTS subroutine determines (1420) that the CUID is not seven characters in length, then the CHECK_USER_INPUTS subroutine displays (1422) a message to the user, which indicates that the CUID is not seven characters in length, and subsequently exits the subroutine to obtain a proper CUID. If, on the other hand, the CHECK_USER_INPUTS subroutine determines (1420) that the CUID is seven characters, then the CHECK_USER_INPUTS subroutine further determines (1424) whether or not the seventh character of the CUID is numeric. If the CHECK_USER_INPUTS subroutine determines (1424) that the seventh character of the CUID is not numeric, then the CHECK_USER_INPUTS subroutine displays (1426) a message to the user, which indicates that the seventh character of the CUID must be numeric, and subsequently exits the subroutine to obtain a proper CUID. If the CHECK_USER_INPUTS subroutine determines (1424) that the seventh character of the CUID is numeric, then the CHECK_USER_INPUTS subroutine continues to FIG. 14C.

As shown in FIG. 14C, once either the UID or CUID have properly been entered and obtained by the program according to FIG. 14A or FIG. 14B, the CHECK_USER_INPUTS subroutine determines (1428) whether or not a company name is missing. If the company name is missing, then the CHECK_USER_INPUTS subroutine displays (1430) a message to the user indicating that the company name is a required field, and subsequently exits the subroutine to obtain the company name. If, on the other hand, the company name is not missing, then the CHECK_USER_INPUTS subroutine determines (1432) whether or not the first name of the user is missing. If the first name of the user is missing, then the CHECK_USER_INPUTS subroutine displays (1434) a message indicating that the first name of the user is a required field, and subsequently exits the subroutine to obtain the first name of the user. If, on the other hand, the first name of the user is not missing, then the CHECK_USER_INPUTS subroutine determines (1436) whether or not the last name of the user is missing. If the last name of the user is missing, then the CHECK_USER_INPUTS subroutine displays (1438) a message indicating that the last name of the user is a required field, and subsequently exits to obtain the last name of the user. If, on the other hand, the last name of the user is not missing, then the CHECK_USER_INPUTS subroutine determines (1440) whether or not the first line of the user's address is missing. If the first line of the user's address is missing, then the CHECK_USER_INPUTS subroutine displays (1442) a message indicating that the first line of the user's address is a required field, and subsequently exits the subroutine to obtain the first line of the user's address. If, on the other hand, the first line of the user's address is not missing, then the CHECK_USER_INPUTS subroutine determines (1444) whether or not the field for the city is NULL. If the field for the city is NULL, then the CHECK_USER_INPUTS subroutine displays (1446) a message indicating that the city is a required field, and subsequently exits the subroutine for input of the city. If, on the other hand, the field for city is not NULL, then the CHECK_USER_INPUTS subroutine continues to FIG. 14D.

Figure 14D:
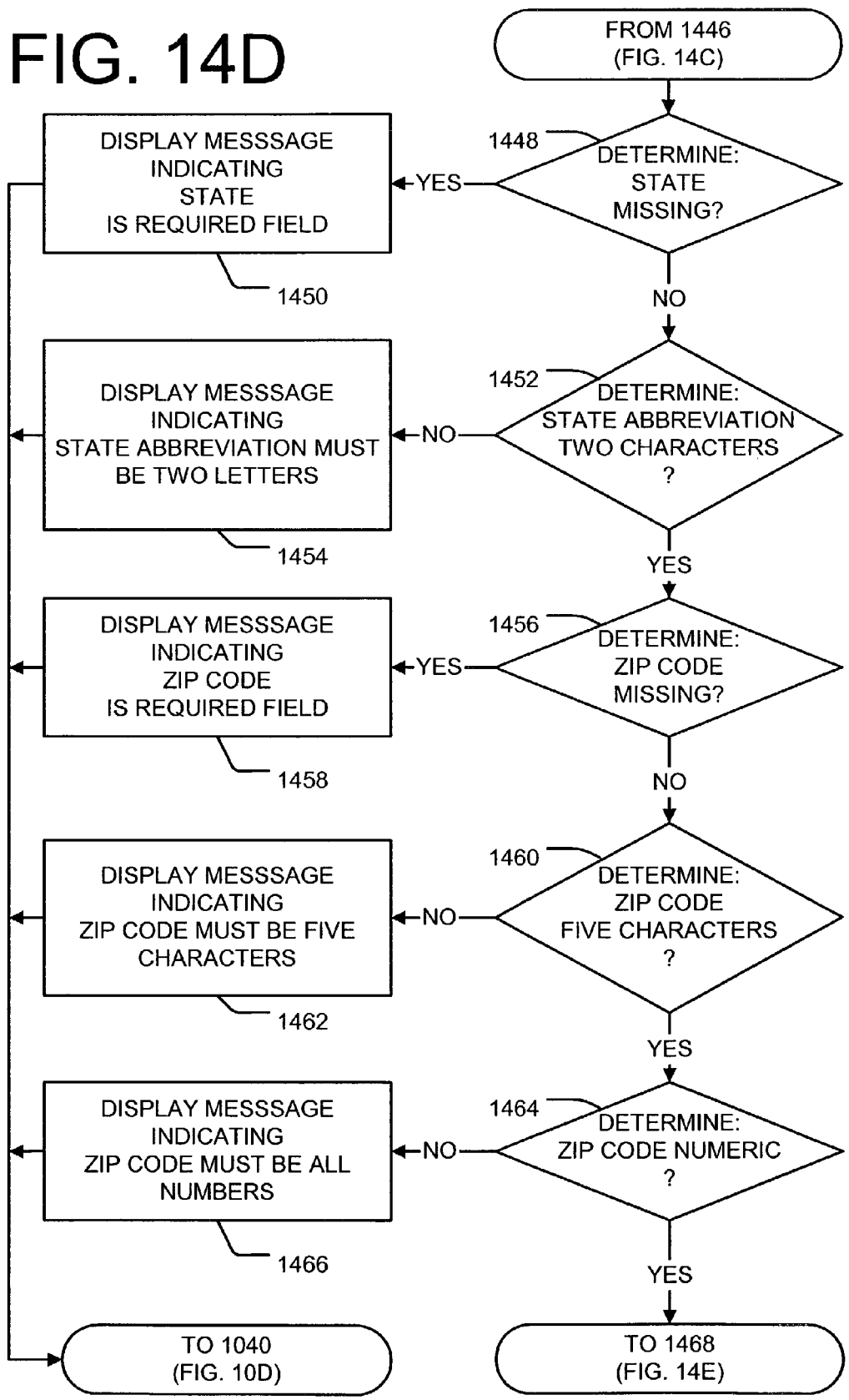

As shown in FIG. 14D, the CHECK_USER_INPUTS subroutine continues from, FIG. 14C by determining (1448) whether or not the field for state is NULL. If the field for the state is NULL, then the CHECK_USER_INPUTS subroutine displays (1450) a message indicating that the state is a required field, and subsequently exits the subroutine for input of the state. If, on the other hand, the field for state is not NULL, then the CHECK_USER_INPUTS subroutine determines whether or not the abbreviation for the state is two characters. If the abbreviation for the state is not two characters, then the CHECK_USER_INPUTS subroutine displays (1454) a message indicating that the state abbreviation must be two letters, and subsequently exits the subroutine to obtain a proper state abbreviation. If, on the other hand the abbreviation for the state is two characters, then the CHECK_USER_INPUTS subroutine determines (1456) whether or not the zip code is missing. If the zip code is missing, then the CHECK_USER_INPUTS subroutine displays (1458) a message indicating that the zip code is a required field, and subsequently exits the subroutine to obtain a zip code. If, on the other hand, the zip code is not missing, then the CHECK_USER_INPUTS subroutine determines (1460) whether or not the zip code is five characters in length. If the zip code is not five characters in length, then the CHECK_USER_INPUTS subroutine displays (1462) a message indicating that the zip code must be five characters in length, and subsequently exits the subroutine to obtain a proper zip code. If, on the other hand, the zip code is five characters in length, then the CHECK_USER_INPUTS subroutine determines (1464) whether or not the zip code is numeric. If the zip code is not numeric, then the CHECK_USER_INPUTS subroutine displays (1466) a message indicating that the zip code must be all numbers. If, on the other hand, the zip code is numeric, then the CHECK_USER_INPUTS subroutine continues to FIG. 14E.

Figure 14E:
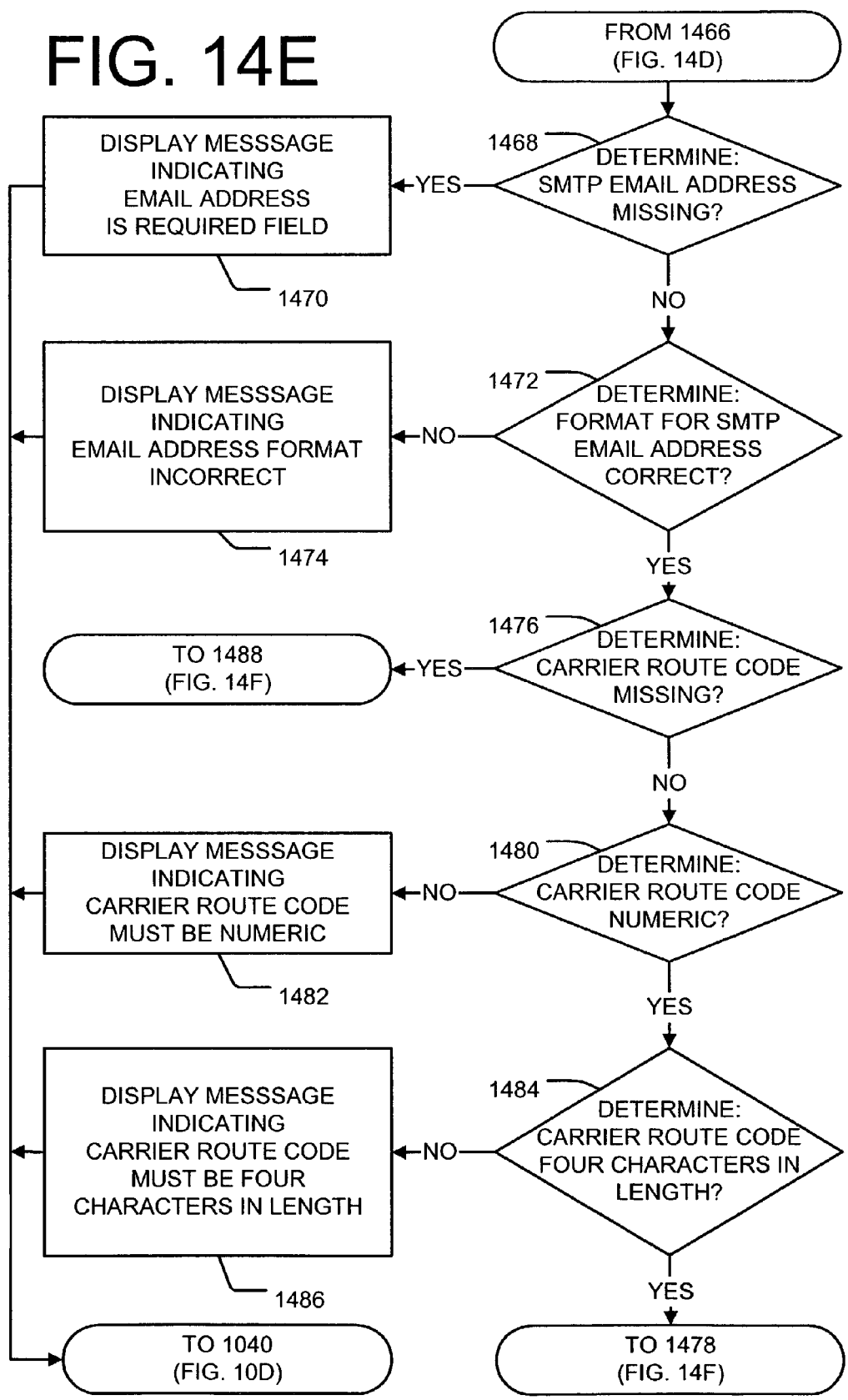

As shown in FIG. 14E, once the proper zip code has been obtained, the CHECK_USER_INPUTS subroutine determines (1468) whether or not a simple mail transfer protocol (SMTP) email address is missing. If the SMTP email address is missing, then the CHECK_USER_INPUTS subroutine displays (1470) a message indicating that SMTP email address is a required field, and subsequently exits the subroutine to obtain an SMTP email address. If, on the other hand, the SMTP email address is not missing, then the CHECK_USER_INPUTS subroutine determines (1472) whether or not the format for the SMTP email address is correct. If the format for the SMTP email address is incorrect, then the CHECK_USER_INPUTS subroutine displays (1474) a message indicating that the email address format is incorrect. If, on the other hand, the format for the SMTP email address is correct, then the CHECK_USER_INPUTS subroutine determines (1476) whether or not a carrier route code is missing. If the carrier route code is missing, then the CHECK_USER_INPUTS subroutine continues to the retrieving (1488) of a computer name from the operating system, as shown in FIG. 14F. If, on the other hand, the carrier route code is not missing, then the CHECK_USER_INPUTS subroutine determines (1484) whether or not the carrier route code is four characters in length. If the carrier route code is not four characters in length, then the CHECK_USER_INPUTS subroutine displays (1486) a message indicating that the carrier route code must be four characters in length, and subsequently exits the subroutine for correction of the carrier route code. If, on the other hand, the carrier route code is four characters in length, then the CHECK_USER_INPUTS subroutine continues to FIG. 14F.

As shown in FIG. 14F, if a proper carrier route code has been entered, then the CHECK_USER_INPUTS subroutine concatenates (1478) the zip code and the carrier route code. Upon concatenating (1478) the zip code and the carrier route code, the CHECK_USER_INPUTS subroutine retrieves (1488) the computer name from the operating system, and determines (1490) whether both UID and CUID were available. If both UID and CUID were available, then the CHECK_USER_INPUTS subroutine sets (1494) a temporary variable TEMP_ID to UID, and subsequently exits the subroutine. If, on the other hand, either UID or CUID were not available, the CHECK_USER_INPUTS subroutine determines (1492) whether only the UID was available. If only the UID was available, then the CHECK_USER_INPUTS subroutine sets (1494) TEMP_ID to UID, and subsequently exits the subroutine. If, on the other hand, only the CUID was available, then the CHECK_USER_INPUTS subroutine sets (1496) TEMP_ID to CUID, and subsequently exits the subroutine. This variable, TEMP_ID, is used by the data collection program to correlate the data being collected with the user.

Figure 15:
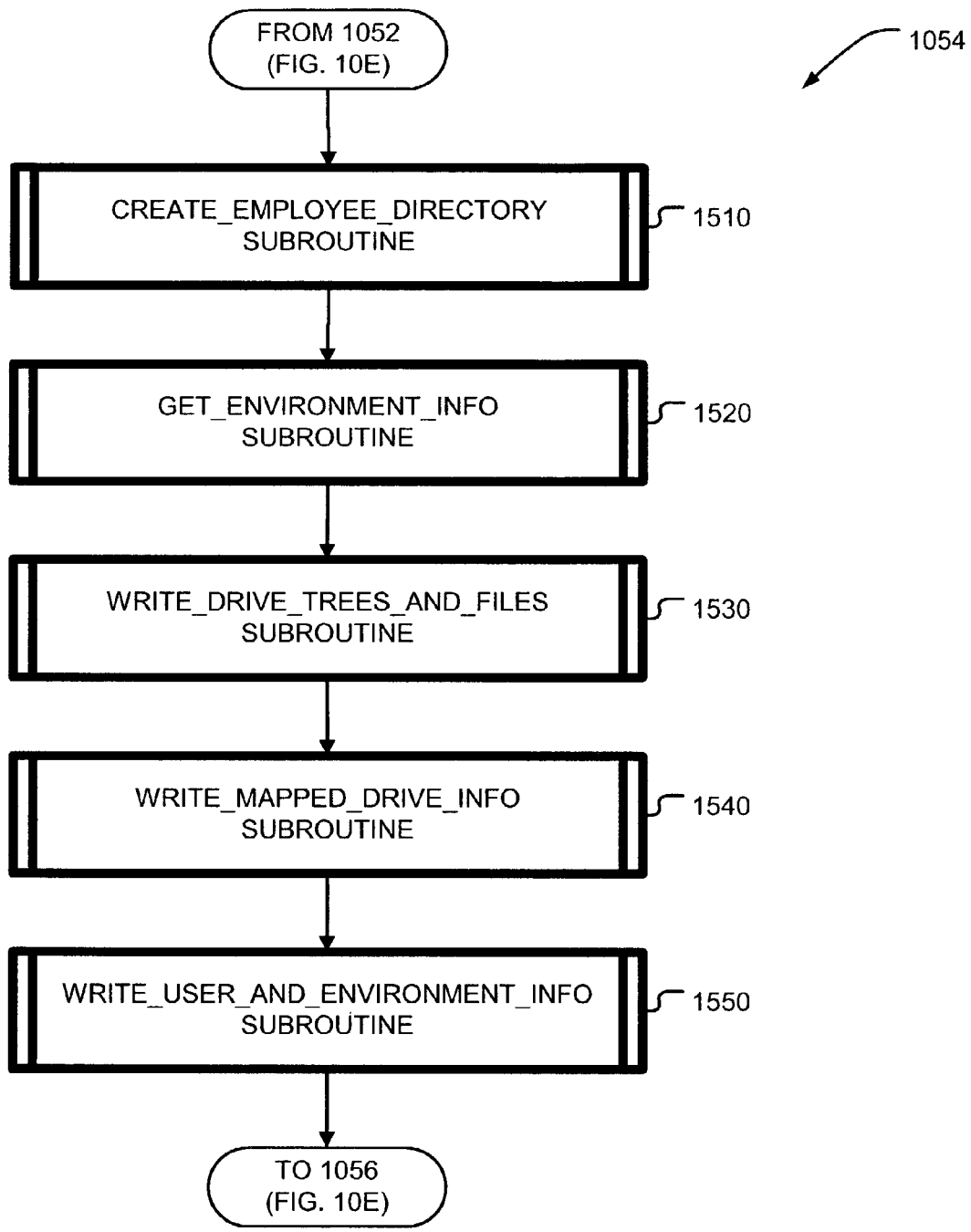
FIG. 15 is a flowchart showing, in greater detail, the PROCESS_DATA subroutine shown in FIG. 10E.

FIG. 15 is a flowchart showing, in greater detail, the PROCESS_DATA subroutine shown in FIG. 10E. In the specific embodiment shown in FIG. 15, the PROCESS_DATA subroutine may be seen as a process comprising five other subroutines. As such, the PROCESS_DATA subroutine begins by calling (1510) CREATE_EMPLOYEE_DIRECTORY subroutine. As one may guess, the CREATE_EMPLOYEE_DIRECTORY subroutine is responsible for creating the employee directory at the central server 110 (FIG. 1). Once the CREATE_EMPLOYEE_DIRECTORY subroutine has been called and executed, the PROCESS_DATA subroutine calls (1520) GET_ENVIRONMENT_INFO subroutine. The GET_ENVIRONMENT_INFO subroutine is responsible for obtaining environment information associated with the computing environment of the workstation 120 (FIG. 1) of the user. Once GET_ENVIRONMENT_INFO subroutine has been called and executed, the PROCESS_DATA subroutine calls (1530) WRITE_DRIVE_TREES_AND_FILES subroutine, which is responsible for copying the drive trees and files from the workstation 120 (FIG. 1) to the central server 110 (FIG. 1). Upon calling and executing the WRITE_DRIVE_TREES_AND_FILES subroutine, the PROCESS_DATA subroutine calls (1540) WRITE_MAPPED_DRIVE_INFO subroutine, which writes the mapped drive information of the workstation 120 (FIG. 1) should the workstation 120 (FIG. 1) be a part of a distributed file system (DFS) environment. When the WRITE_MAPPED_DRIVE_INFO subroutine is finished, the PROCESS_DATA subroutine calls (1550) WRITE_USER_AND_ENVIRONMENT_INFO subroutine, which writes user and environment information to the central server 110 (FIG. 1).

Figure 15A:
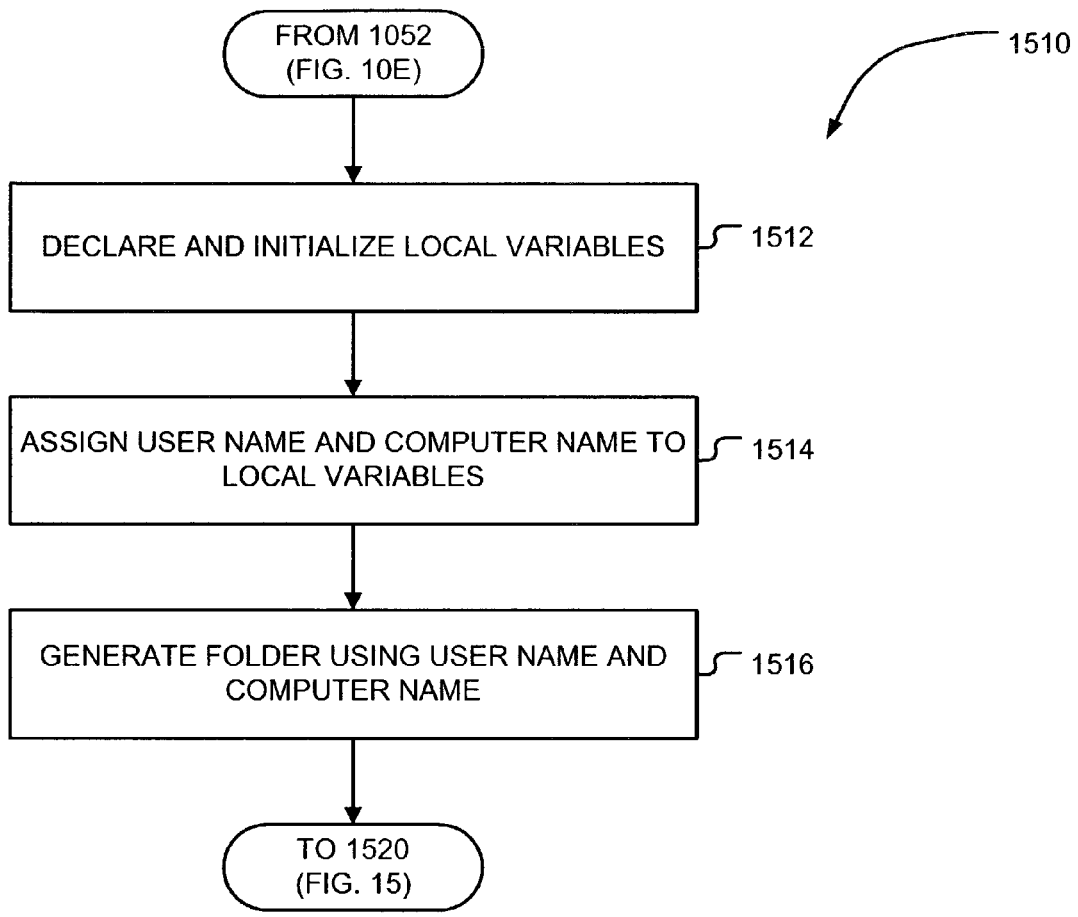
FIG. 15A is a flowchart showing, in greater detail, the CREATE_EMPLOYEE_DIRECTORY subroutine shown in FIG. 15.

FIG. 15A is a flowchart showing, in greater detail, the CREATE_EMPLOYEE_DIRECTORY subroutine shown in FIG. 15. As shown in FIG. 15A, local variables are declared (1512) and initialized in the CREATE_EMPLOYEE_DIRECTORY subroutine. Once the local variables are declared (1512) and initialized, the CREATE_EMPLOYEE_DIRECTORY subroutine assigns (1514) the user name and the computer name to the declared (1512) local variables, and subsequently generates (1516) a folder at the central server 110 (FIG. 1) using the user name and the computer name.

Figure 15B:
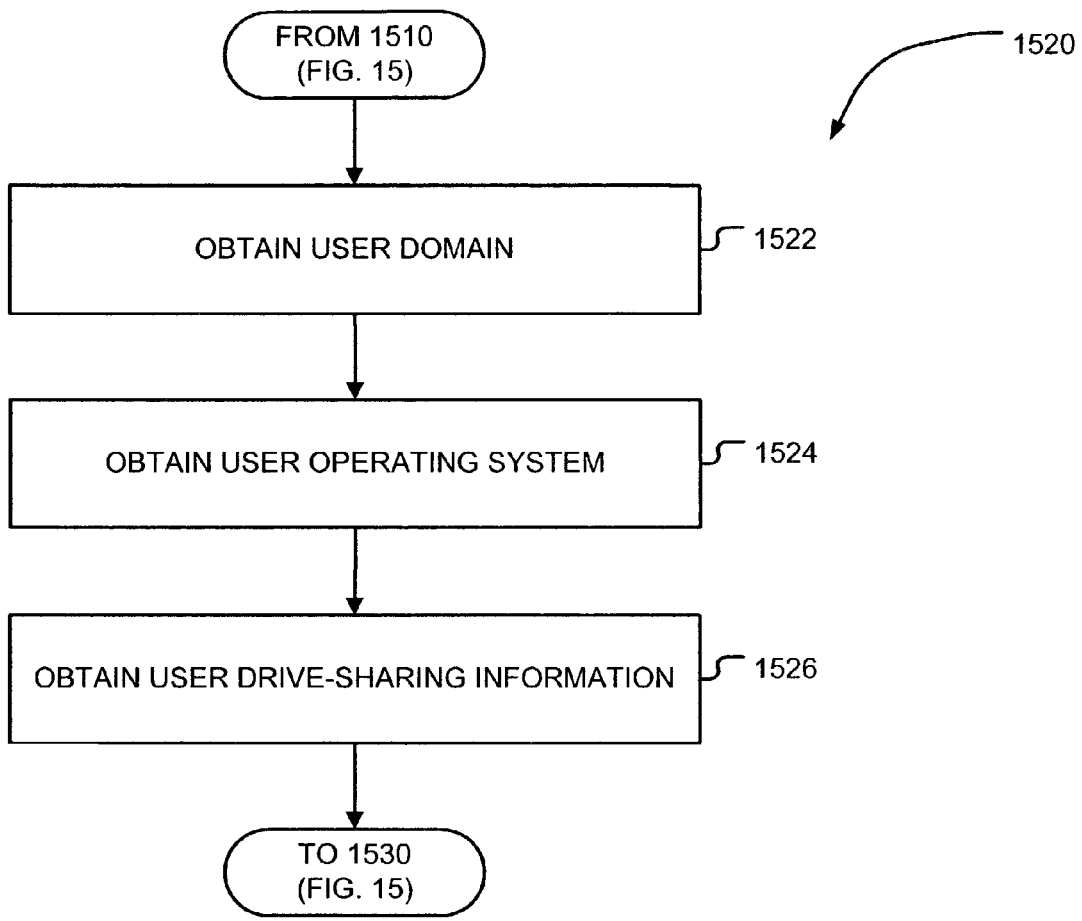
FIG. 15B is a flowchart showing, in greater detail, the GET_ENVIRONMENT_INFO subroutine shown in FIG. 15.

FIG. 15B is a flowchart showing, in greater detail, the GET_ENVIRONMENT_INFO subroutine shown in FIG. 15. As shown in FIG. 15B, the GET_ENVIRONMENT_INFO subroutine obtains (1522) a user domain if the workstation 120 (FIG. 1) is located on a network. Additionally, the GET_ENVIRONMENT_INFO subroutine obtains (1524) the user's operating system that is running on the workstation 120 (FIG. 1). Also, the GET_ENVIRONMENT_INFO subroutine obtains (1526) drive-sharing information if the workstation 120 (FIG. 1) operates in a distributed file system (DFS) environment.

Figure 15C:
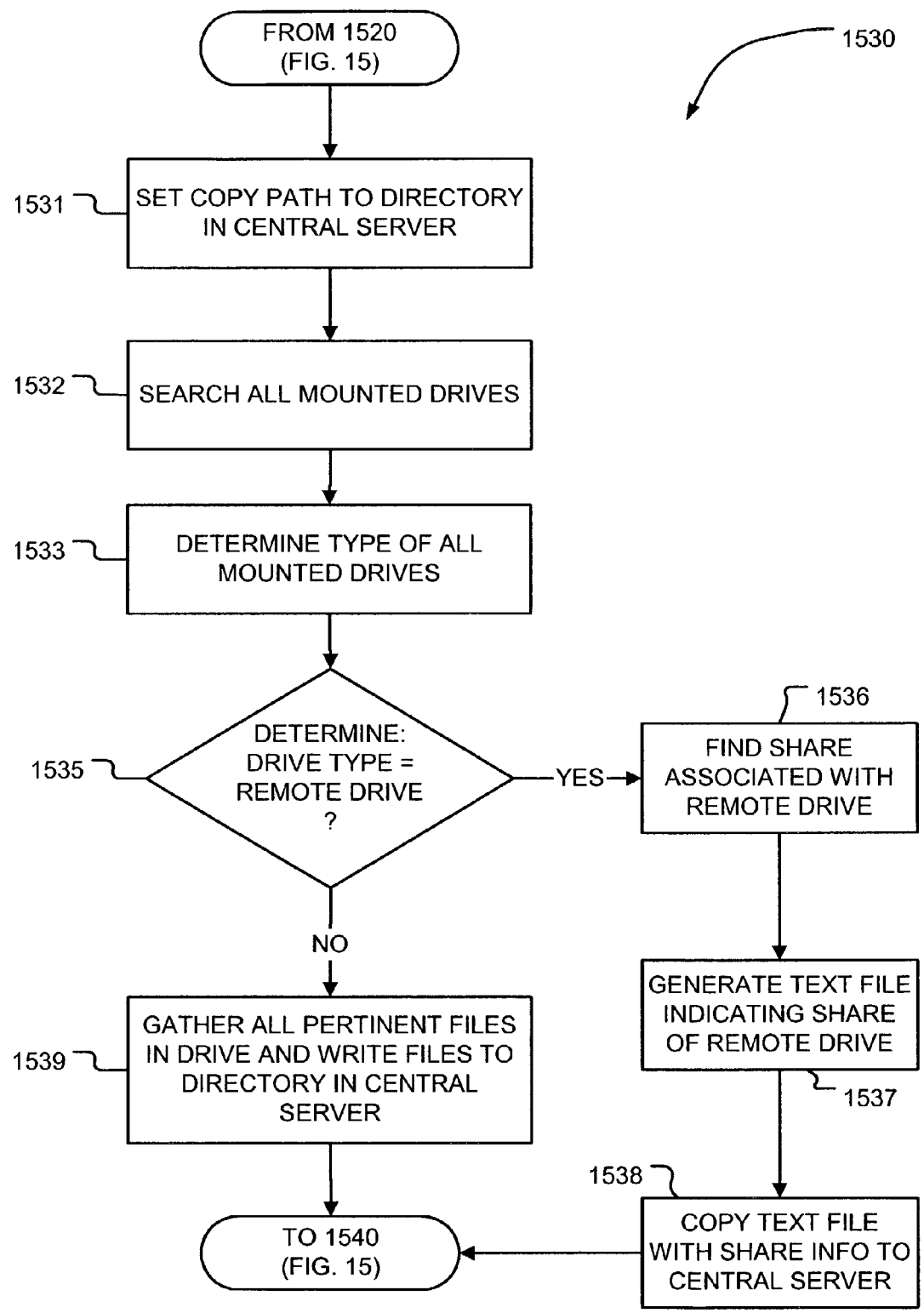
FIG. 15C is a flowchart showing, in greater detail, the WRITE_DRIVE_TREES_AND_FILES subroutine shown in FIG. 15.

FIG. 15C is a flowchart showing, in greater detail, the WRITE_DRIVE_TREES_AND_FILES subroutine shown in FIG. 15. As shown in FIG. 15C, the WRITE_DRIV- E_TREES_AND_FILES subroutine begins by setting (1531) a copy path to the user directory in the central server 110 (FIG. 1). Once the copy path has been set (1531), the WRITE_DRIVE_TREES_AND_FILES subroutine searches (1532) all of the mounted drives if the workstation 120 (FIG. 1) is operating in a DFS environment. Upon finding all the mounted drives, the WRITE_DRIVE_TREES_AND_FILES subroutine determines (1533) the types of all the mounted drives, and further determines (1535) whether or not the drive type is a remote drive type. If the drive type is not a remote drive type, then the WRITE_DRIVE_TREES_AND_FILES subroutine gathers (1539) all of the pertinent files, in the drive and writes the gathered (1539) files to the user directory in the central server 110 (FIG. 1). If, on the other hand, the drive type is a remote drive type, then the WRITE_DRIVE_TREES_AND_FILES subroutine finds (1536) share information associated with the remote drive, and generates (1537) a text file with the share information. The text file is then copied (1538) to the central server 110 (FIG. 1) by the WRITE_DRIVE_TREES_AND_FILES subroutine.

Figure 15D:
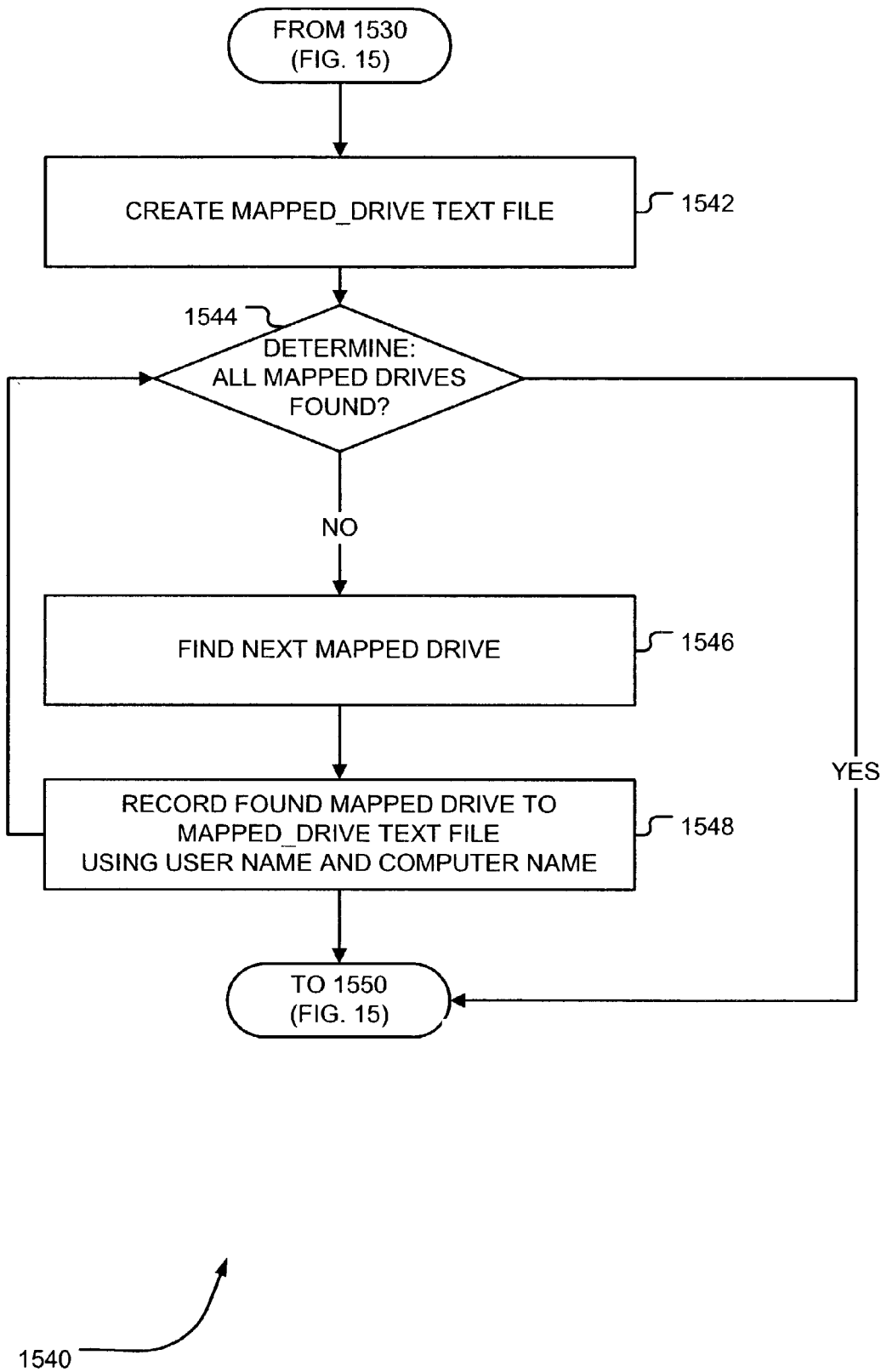
FIG. 15D is a flowchart showing, in greater detail, the WRITE_MAPPED_DRIVE_INFO subroutine shown in FIG. 15.

FIG. 15D is a flowchart showing, in greater detail, the WRITE_MAPPED_DRIVE_INFO subroutine shown in FIG. 15. As shown in FIG. 15D, the WRITE_MAPPED_DRIVE_INFO subroutine begins by creating (1542) a MAPPED_DRIVE text file in the user directory at the central server 110 (FIG. 1). Once the MAPPED_DRIVE text file has been written to the user directory, the WRITE_MAPPED_DRIVE_INFO subroutine determines (1544) whether or not all of the mapped drives have been found. If all of the mapped drives have been found, then the subroutine exits. If, however, all of the mapped drives have not been found, then the WRITE_MAPPED_DRIVE_INFO subroutine finds (1546) the next mapped drive. The WRITE_MAPPED_DRIVE_INFO subroutine then records (1548) the mapped drive to the MAPPED_DRIVE text file along with the user name and computer name to identify which workstation 120 (FIG. 1) is associated with the mapped drive. Once this is done, the WRITE_MAPPED_DRIVE_INFO subroutine loops back and determines (1544), again, whether or not all mapped drives have been found. This loop is repeated until all mapped drives have been found (1546) and recorded (1548) in the MAPPED_DRIVE text file at the central server 110 (FIG. 1).

Figure 15E:
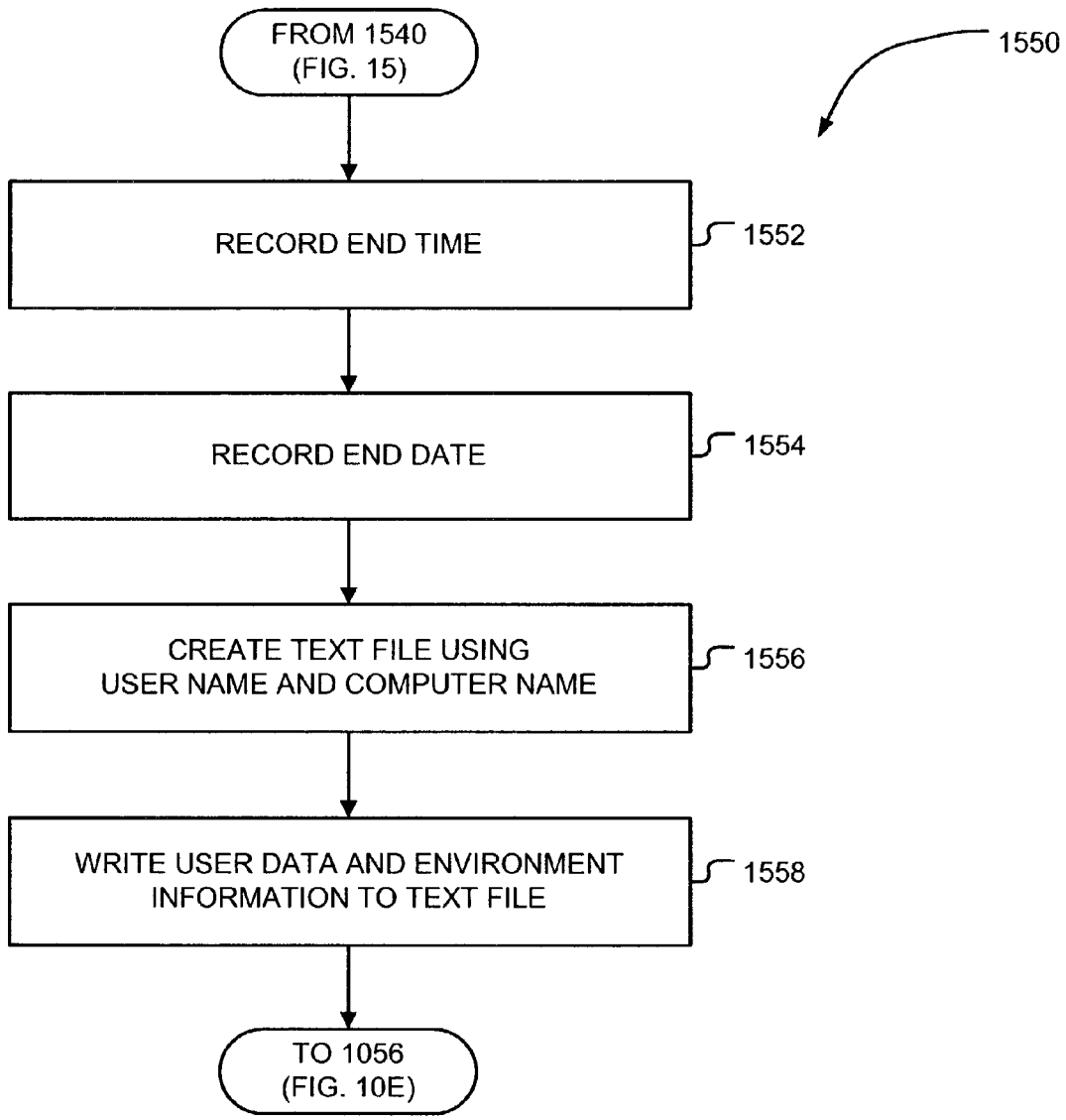
FIG. 15E is a flowchart showing, in greater detail, the WRITE_USER_AND_ENVIRONMENT_INFO subroutine of FIG. 15.

FIG. 15E is a flowchart showing, in greater detail, the WRITE_USER_AND_ENVIRONMENT_INFO subroutine of FIG. 15. As shown in FIG. 15E, the WRITE_USER_AND_ENVIRONMENT_INFO subroutine marks the end of the data collecting process. Thus, the WRITE_USER_AND_ENVIRONMENT_INFO subroutine records (1552) an end time associated with the completion of the data collection, and also records (1554) an end date associated with the completion of the data collection. Once the end time and end date have been recorded (1552, 1554), the WRITE_USER_AND_ENVIRONMENT_INFO subroutine creates (1556) a text file in the user directory at the central server 110 (FIG. 1), which is identified by the user name and the computer name. Once the text file is created (1556), the WRITE_USER_AND_ENVIRONMENT_INFO subroutine writes (1558) the user data and the environment information into the created (1556) text file.

As seen from the flowcharts of FIGS. 10A through 15E, this embodiment of the method provides for a simpler and less laborious task in collecting information. While FIGS. 10A through 15E are show execution of a specific computer code, which carries out the general steps outlined in FIGS. 4 through 9, another embodiment of the method may be conceptually viewed from the perspective of the central server 110 (FIG. 1). One embodiment of the method steps as carried out at the central server 110 (FIG. 1) are shown in FIGS. 16 through 21.

Figure 16:
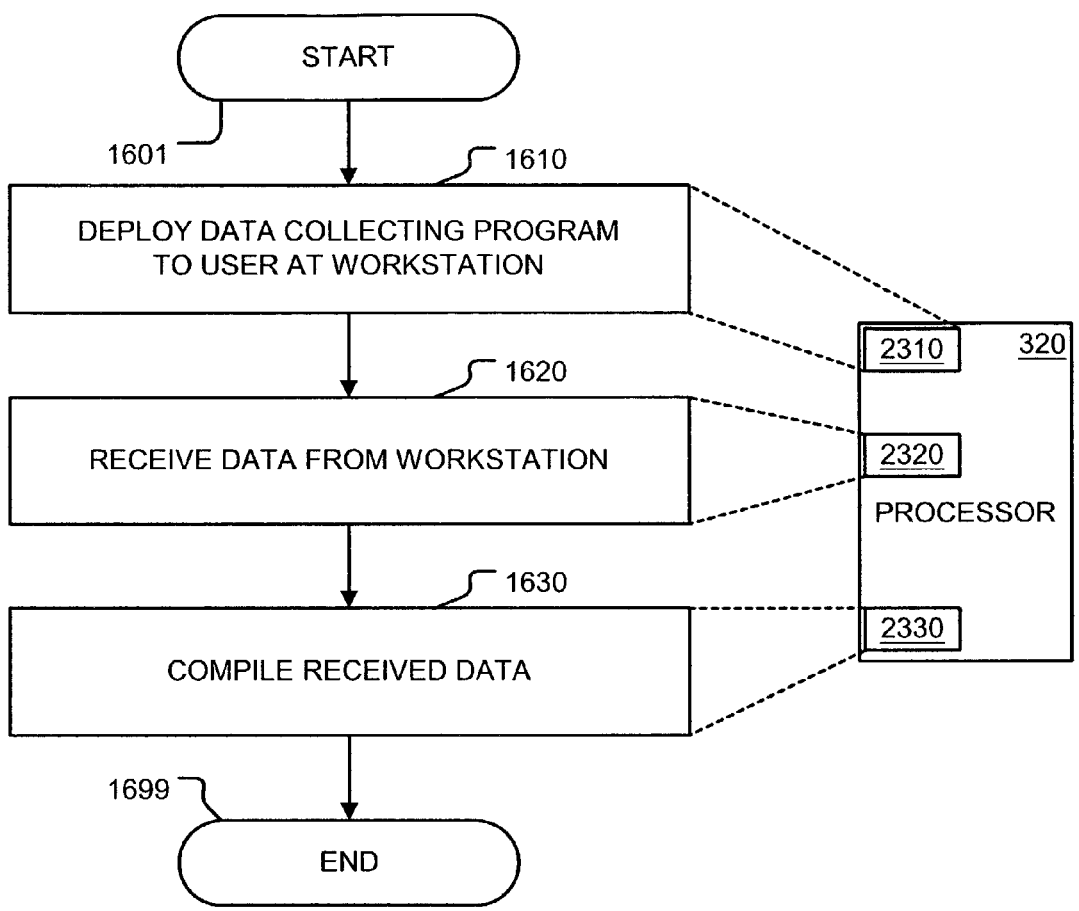
FIG. 16 is a flowchart showing steps performed by various logic components in the processor of the central server of FIG. 2.

FIG. 16 is a flowchart showing steps performed by various logic components 2310, 2320, 2330 in the processor 320 of the central server 110 of FIG. 3. In this regard, the program may be stored on a central server storage drive 350 and loaded into memory 340 to be executed by the processor 320. Since the process of executing computer code is well known, further discussion of computer code execution is omitted here. Since, in the embodiment of FIG. 16, the steps of the flowchart are executed by the processor 320, the logic components 2310, 2320, 2330 may be seen as various programmable segments of the processor 320. Thus, as shown in FIG. 16, the processor 320 of the central server 110 (FIG. 3) deploys (1610) a data collection program to a user at a workstation 120 (FIG. 2). Once the user has run the data collection program (as described with reference to FIGS. 4 through 9 or also as described with reference to FIGS. 10A through 15E), data from the workstation 120 (FIG. 2) is received (1620) and compiled (1630) at the central server 110 (FIG. 3).

Figure 17:
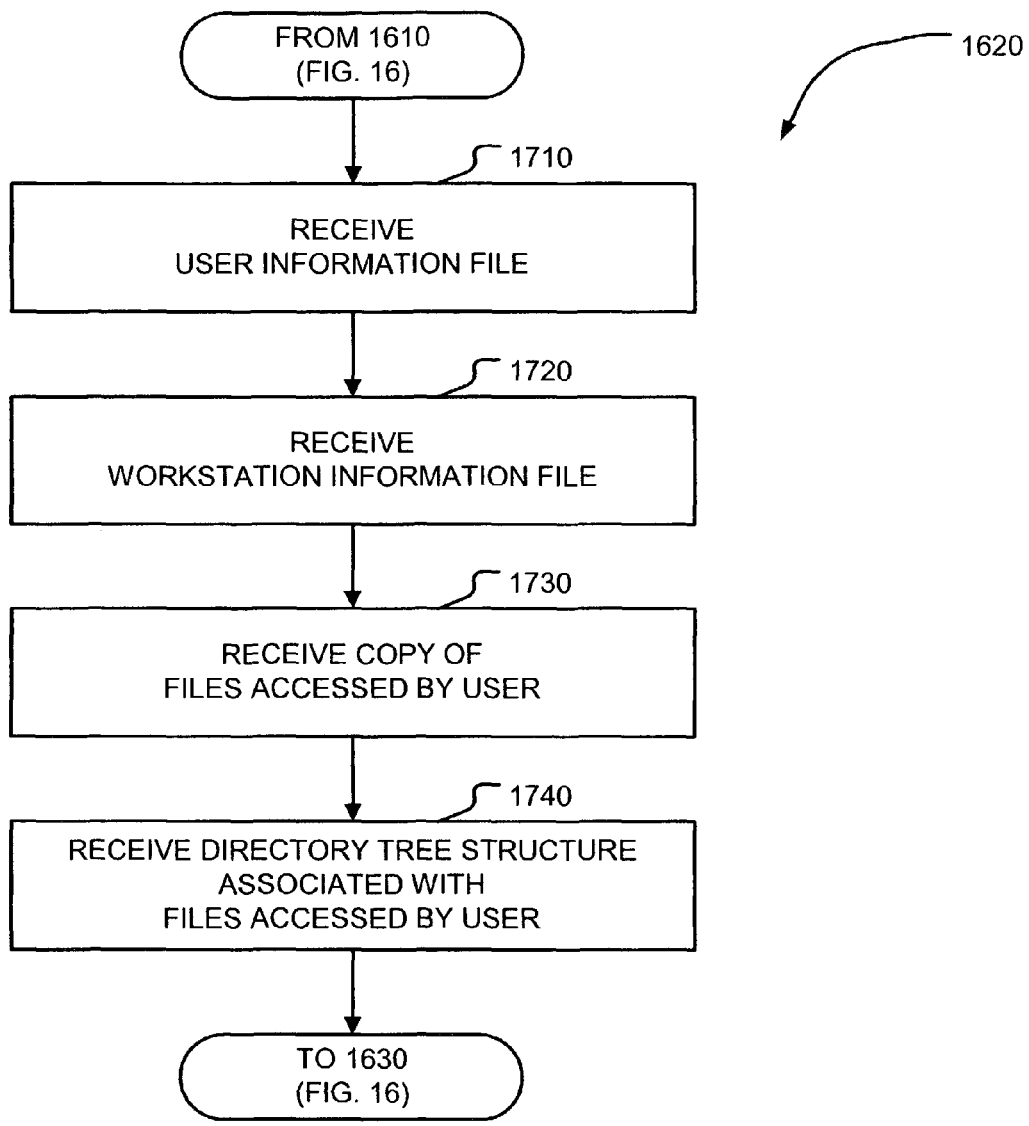
FIG. 17 is a flowchart showing, in greater detail, the step of receiving data shown in FIG. 16.

FIG. 17 is a flowchart showing, in greater detail, the step of receiving (1620) data shown in FIG. 16. As shown in FIG. 17, the receiving (1620) of the data includes the receiving (1710) of a user information file, which is a file having information related to the user at the workstation 120 (FIG. 2). Additionally, the receiving (1620) of the includes the receiving (1720) of a workstation information file, which is a file having information related to the workstation 120 (FIG. 2) itself. In one embodiment, these files are files that have been generated by the process as outlined in FIGS. 4 through 9 or, alternatively, by the process as outlined in FIGS. 10A through 15E. The receiving (1620) of the data further comprises the receiving (1730) of a copy of the files accessed by the user (or associated with the user) and, also, receiving (1740) a directory tree structure associated with those files.

Figure 18:
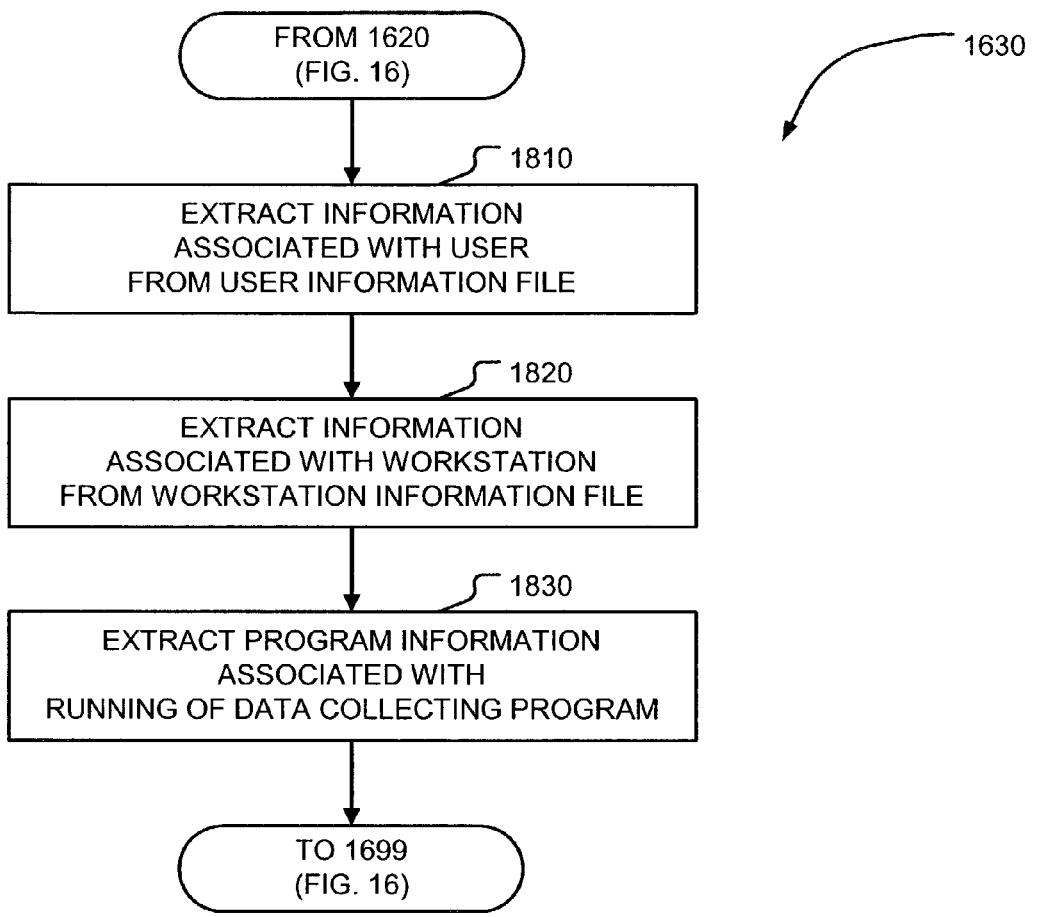
FIG. 18 is a flowchart showing, in greater detail, the step of compiling data shown in FIG. 16.

FIG. 18 is a flowchart showing, in greater detail, the step of compiling (1630) data shown in FIG. 16. In one embodiment, the compiling (1630) may be seen as a gathering of user information from their respective files and re-organizing the information as desired. Thus, as shown in FIG. 18, once the data has been collected at the central server 110 (FIG. 1), the information that is associated with the user is extracted (1810) from the user information file. In one embodiment, the extracting (1810) may be a reading of the user information from the user information file, and a subsequent writing or storing of the user information into a separate file having other user information. Also, the information that is associated with the workstation 120 (FIG. 1) is extracted (1820) from the workstation information file. In addition to information related to the user and the workstation 120 (FIG. 1), program information associated with the running of the data collection program is extracted (1830).

Figure 19B:
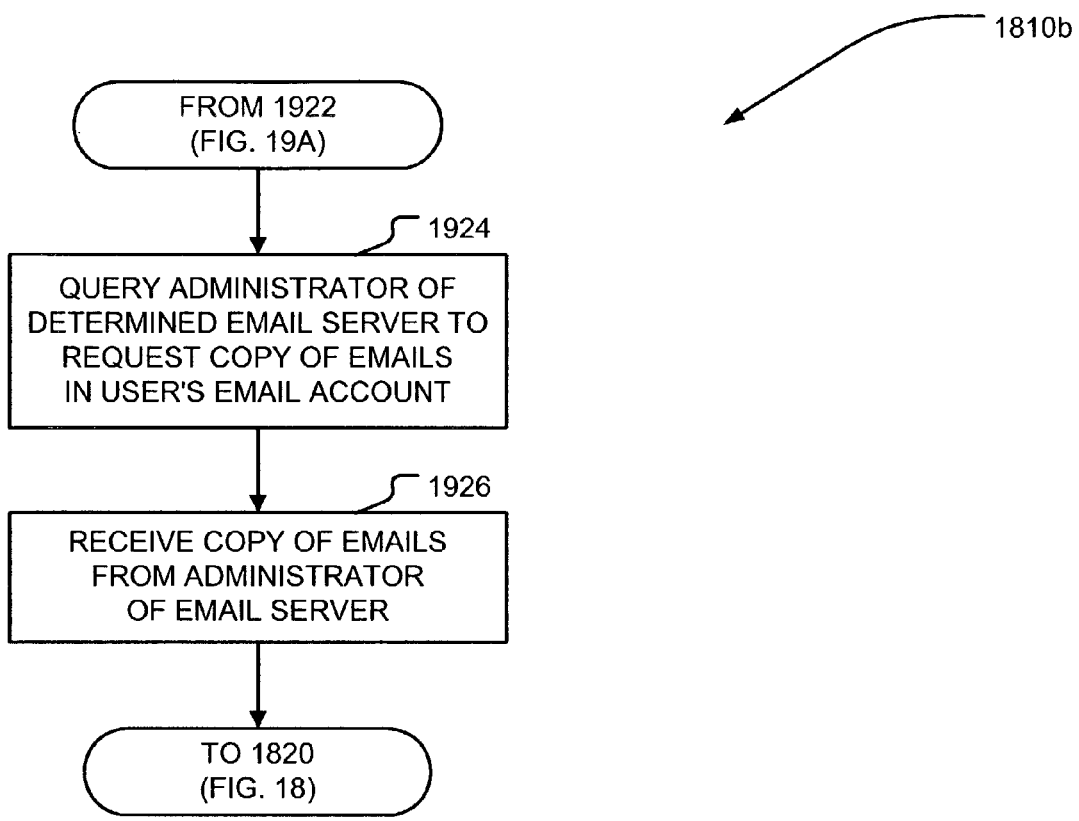
Figure 19C:
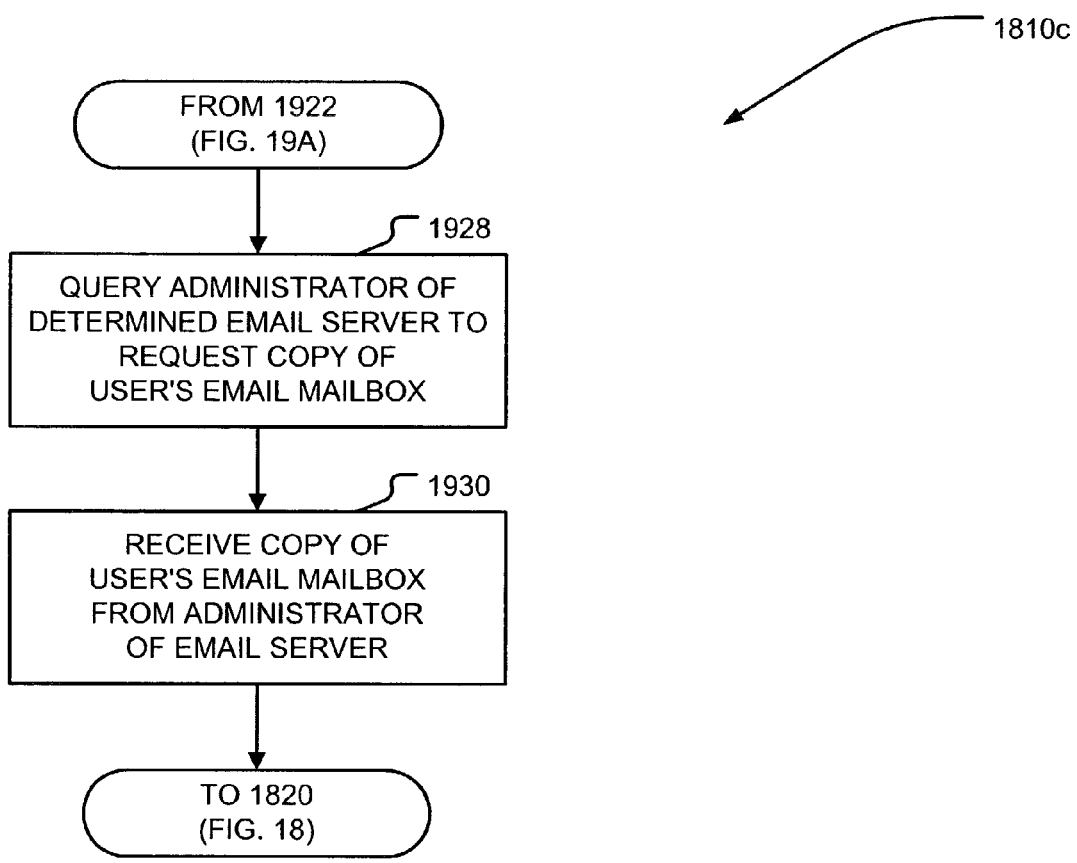

FIGS. 19A through 19C are flowcharts showing, in greater detail, the step of extracting (1810) information associated with the user shown in FIG. 18. As shown in FIGS. 19A through 19C, the user, in this example, has been assigned both a user identification (UID) and a common user identification (CUID). As shown in FIG. 18, once the user information file has been placed at the central server 110 (FIG. 1), it is determined (1902) whether or not a user identification (UID) is associated with the user information file (i.e., determined whether or not a UID exists). If a UID is associated with the file, the UID is extracted 1904. If, on the other hand, a UID is not associated with the file, then a common user identification (CUID) is extracted (1906) from the user information file. Once either the UID or CUID have been extracted (1904,

1906) from the user information file, the last name of the user is extracted (1908) and, subsequently, the first name of the user is also extracted (1910). Thereafter, a street address of the user is extracted (1912), a city associated with the user's address is extracted (1914), a state associated with the user's address is extracted (1916), and a zip code associated with the user's address is extracted (1918). Additionally, an email address is extracted (1919) from the user information file, and the type of email account is determined (1920) from the extracted (1919) email address. Once the type of email account has been determined, an email server (and location) associated with the type of email account is determined (1922) from the extracted email address. At this point, the process may exit to the extracting (1820) of the workstation information or may continue to FIG. 19B. Similarly, at this point, the process may exit to the extracting (1820) of the workstation information or may continue to FIG. 19C. Thus, FIGS. 19A and 19B show one embodiment, while FIGS. 19A and 19C show another embodiment.

In one embodiment, once the type of email account and the email server have been determined (1920, 1922), an email administrator at the email server is queried (1924) as shown in FIG. 19B, thereby requesting a copy of the email messages in the user's email account. In an example embodiment, the email administrator is queried (1924) by an individual that is compiling the user information. When the email administrator sends a copy of the requested email messages, the copy of the email messages are received (1926) at the central server 110 (FIG. 1). Upon receiving (1926) the copy of the email messages, the process exits to the extracting (1820) of the workstation information shown in FIG. 18. Since email mailboxes are typically stored and archived at an email server using a particular configuration as defined by the email server, the embodiment of FIG. 19B permits a more convenient approach to retrieving email messages than retrieving the entire email mailbox.

In another embodiment, once the type of email account and the email server have been determined (1920, 1922), an email administrator at the email server is queried (1928) as shown in FIG. 19C, thereby requesting a copy of the entire email mailbox of the user's email account. Thus, unlike the embodiment of FIG. 19B, which retrieves only the email messages, the embodiment of FIG. 19C retrieves the entire mailbox. When the email administrator sends the mailbox, the mailbox is received (1930) at the central server 110 (FIG. 1). Upon receiving (1930) the copy of the email mailbox, the process exits to the extracting (1820) of the workstation information shown in FIG. 18. While this may present a greater inconvenience to the email administrator, the embodiment of FIG. 19C provides more information since the entire mailbox is being retrieved, rather than merely the email messages.

Figure 20A:
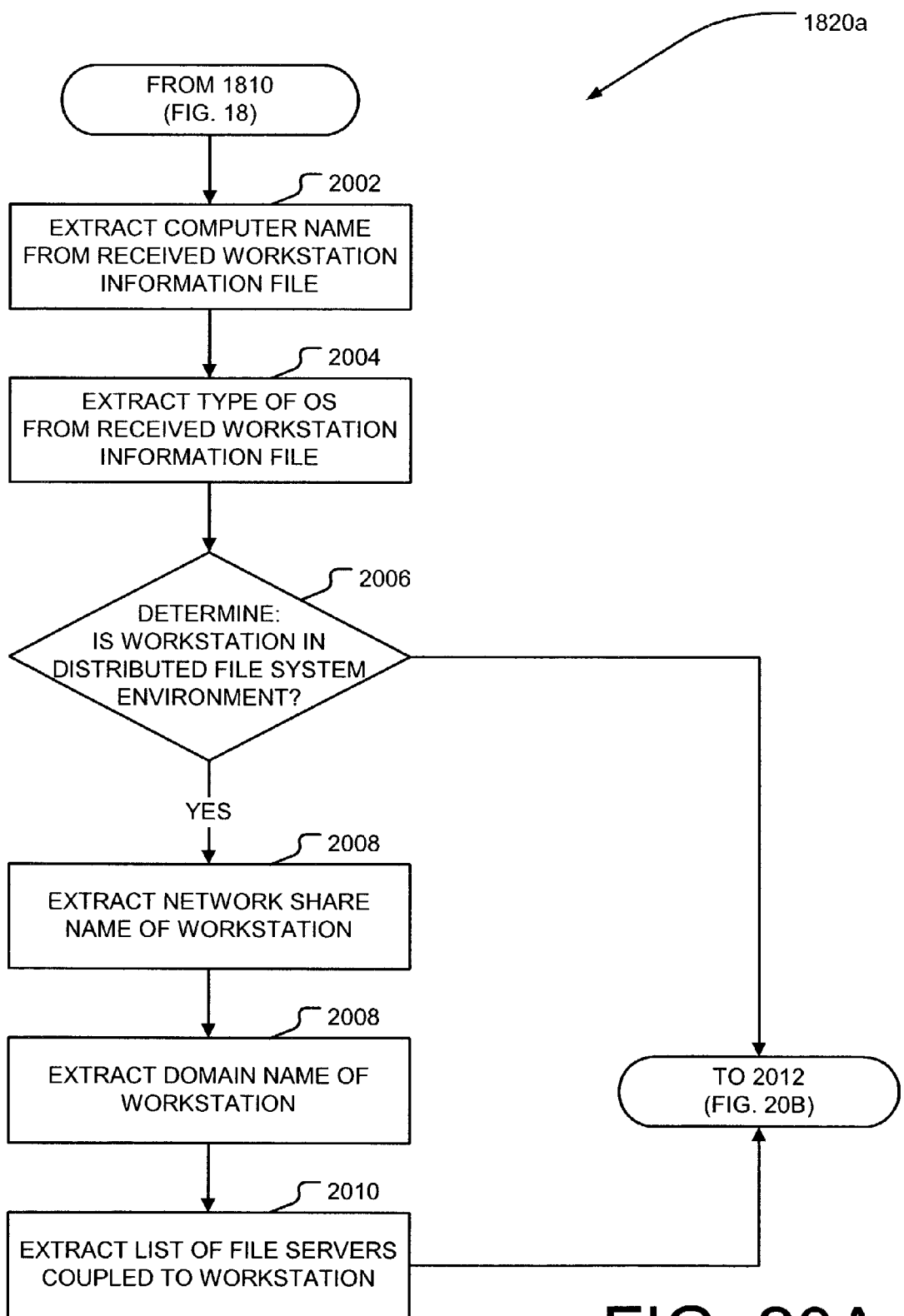
FIGS. 20A through 20B are flowcharts showing, in greater detail, the step of extracting information associated with the workstation shown in FIG. 18.
Figure 20B:
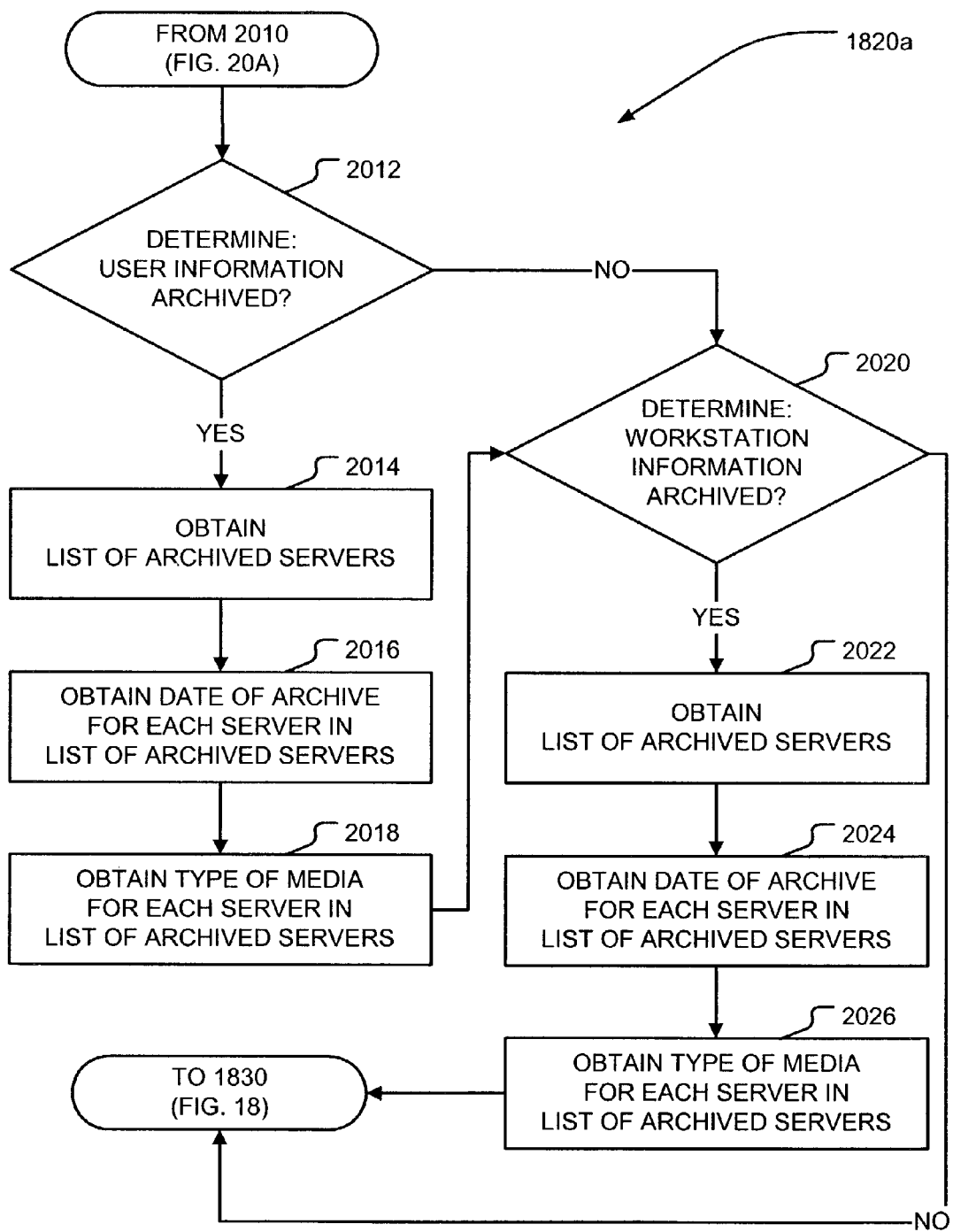

FIGS. 20A through 20B are flowcharts showing, in greater detail, the step of extracting (1820) information associated with the workstation 120 (FIG. 1). In many computer systems, information is archived in order to provide storage space for more current files. Typically, the archived information is stored at a remote location. The archived information may be, correlated to a user logon name or workstation name. Thus, upon determining a computer name and a user logon name, one may find corresponding archived information using the computer name or the user logon name. FIGS. 20A and 20B show embodiments related to retrieving workstation information and user information for both currently available workstation information and archived information.

As shown in FIG. 20A, once the workstation information file has been placed at the central server 110 (FIG. 1), a computer name is extracted (2002) from the workstation information file. Additionally, the type of operating system is extracted (2004) from the workstation information file. Once the computer name and the type of operating system have been extracted (2002, 2004), it is determined (2006) whether or not the workstation 120 (FIG. 1) operated in a distributed file system (DFS) environment. If it is determined (2006) that the workstation 120 (FIG. 1) did not operate in a DFS environment, then the process continues to FIG. 20B. If, on the other hand, it is determined (2006) that the workstation 120 (FIG. 1) operated in a DFS environment, then a network share name of the workstation 120 (FIG. 1) is extracted (2008) from the workstation information file. Additionally, if the workstation 120 (FIG. 1) operated in a DFS environment, then a domain name of the workstation 120 (FIG. 1) is extracted (2008), and a list of file servers coupled to the workstation 120 (FIG. 1) is extracted from the workstation information file. Thereafter, the process continues to FIG. 20B.

As shown in FIG. 20B, the extracting (1820) of workstation information continues with a determining (2012) of whether or not user information has been archived. In one embodiment, the archiving of user information may be determined by looking up the user logon name, which has been retrieved using the program, and subsequently determining whether or not the user has accessed any other application servers, and further determining if information on those application servers has been archived. If it is determined (2012) that user information has not been archived, then it is further determined (2020) whether or not workstation information has been archived. The archiving of the workstation information may be determined in a similar fashion by using the retrieved workstation name, rather than the user logon name.

If it is determined (2012) that user information has been archived, then a list of archived servers having the user information is obtained (2014). Furthermore, dates of archive are obtained (2016) for each list of archived servers having the user information, and type of media is obtained (2018) for each server in the list of archived servers having the user information. Once the archived information has been obtained (2014, 2016, 2018), it is further determined (2020) whether or not workstation information has been archived. If it is determined (2020) that no workstation information has been archived, then the process exits to the extracting (1830) of programming information shown in FIG. 18. If, on the other hand, it is determined (2020) that workstation information has been archived, then a list of archived servers having the workstation information is obtained (2014). Furthermore, dates of archive are obtained (2016) for each list of archived servers having the workstation information, and type of media is obtained (2018) for each server in the list of archived servers having workstation information. Once this information has been obtained, the process exits to the extracting (1830) of programming information shown in FIG. 18.

Figure 21:
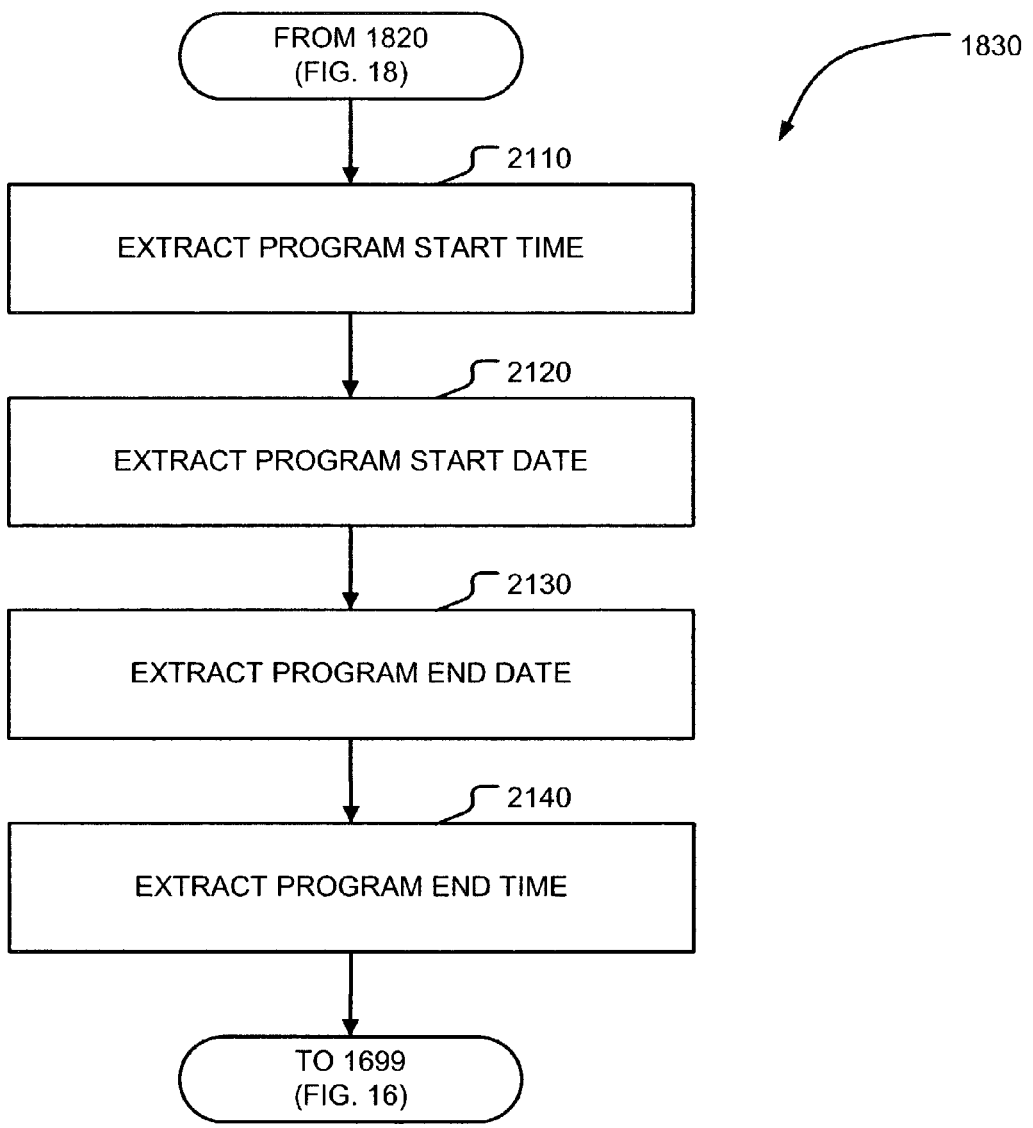
FIG. 21 is a flowchart showing, in greater detail, the step of extracting program information shown in FIG. 18.

FIG. 21 is a flowchart showing, in greater detail, the step of extracting (1830) program information shown in FIG. 18. As shown in FIG. 18, the extracting (1830) of the program information may be seen as including the extraction (2110) of a program start time, the extraction (2120) of a program start date, the extraction (2130) of a program end date, and an extraction (2140) of a program end time.

As seen from the flowcharts of FIGS. 16 through 21, this embodiment of the method provides for a simpler and less laborious task in collecting information. Thus, from both the perspective of the workstation 120 (FIG. 1) and the central server 110 (FIG. 1), the several embodiments of the invention allow for easier and more efficient collection of data for processes such as legal discovery, which previously required arduous manual efforts.

The flow chart of FIGS. 4 through 21 show the architecture, functionality, and operation of a possible implementation of the data collection program software. In this regard, each block represents a module, segment, or portion of code, which comprises one or more executable instructions for implementing the specified logical function(s). It should also be noted that in some alternative implementations, the functions noted in the blocks may occur out of the order noted in FIGS. 4 through 21. For example, while FIG. 15 shows five subroutines associated with the PROCESS_DATA subroutine, it will be clear to one of ordinary skill in the art that, with the exception of the WRITE_USER_AND_ENVIRONMENT_INFO subroutine, these subroutines may be performed out of order, or substantially simultaneously without adverse effect to the method disclosed. Additionally, while the litany of user information in FIGS. 14A through 14F are presented in a specific order, it will be clear to one of ordinary skill in the art that the user information may be queried and obtained in any order without substantially deviating from the spirit and scope of the method disclosed. Thus, any process descriptions or blocks in flow charts should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those reasonably skilled in the art of the present invention.

The data collection program (and all of the subroutines included in the data collection program), which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although an exemplary embodiment of the present invention has been shown and described, it will be apparent to those of ordinary skill in the art that a number of changes, modifications, or alterations to the invention as described may be made, none of which depart from the spirit of the present invention. For example, while a workstation 120 (FIG. 1) has been used for illustrative purposes, it will be clear to one of ordinary skill in the art that any programmable device having user information may be substituted for the workstation 120 without substantially detracting from the spirit and scope of the invention. Additionally, while the central server 110 (FIG. 1) is presented as a stand-alone data storage and execution unit, it will be clear to one of ordinary skill in the art that the central server 110 (FIG. 1) may also be any programmable device having sufficient data storage capacity. Thus, it is intended that all such changes, modifications, and alterations be seen as within the scope of the present invention.

We claim:

1. A method for collecting information comprising:
installing a data collection program on a workstation;
establishing a connection between the workstation and a central server to collect data from the workstation by the data collection program;
receiving user identification from a user;
in response to a verification of the user identification from the user, receiving a system name for the workstation;
determining, at the workstation, whether the workstation includes an email message folder file configured in an authorized format;
in response to a determination that the workstation includes the email message folder file configured in a format that is different than the authorized format, sending an error message to the user; and
in response to a determination that the workstation does not include the email message folder file in a format that is different than the authorized format:
collecting data from the workstation by the data collection program, wherein collecting data from the workstation includes retrieving available user information based on the received user identification, displaying available user information in a pre-populated form, and prompting the user for corrections to data in the pre-populated form, wherein the user is prompted to correct a user email address when the user email address is determined to be in an incorrect format;
writing the collected data to the central server, wherein a user directory is created at the central server for storage of the collected data based on the user name and workstation computer name and a mounted drive is determined to be either a remote drive type or not a remote drive type, wherein for a not remote drive type, files in the drive are transferred to the user directory at the central server and for the remote drive type, share drive information for the remote drive type is saved in a text file and transferred to the user directory at the central server;
severing the connection between the workstation and the central server; and
after the data is collected and written to the central server, deleting by the data collection program files related to execution of the data collection program.

2. The method of claim 1, wherein the collecting the data further comprises:
collecting user personal information; and
collecting workstation information.

3. The method of claim 2, wherein the collecting the user personal further information comprises:
obtaining an email address of the user.

4. The method of claim 3, further comprising:
determining an email server associated with the obtained email address of the user.

5. The method of claim 4, further comprising:
querying an administrator of the email server to provide a copy of the user's emails from the email server; and
receiving a copy of the emails from the queried administrator.

6. The method of claim 4, further comprising:
querying an administrator of the email server to provide a copy of the user's email mailbox; and
receiving a copy of the user's email mailbox from the queried administrator.

7. A system for collecting information comprising:
a processor of the workstation computer installing a data collection program on a local storage device of the workstation computer;
a network interface of the workstation computer establishing a connection between the workstation computer and a central server computer to collect data from the workstation computer by the data collection program;
the processor of the workstation computer determining whether the workstation computer includes an email message folder file configured in an authorized format;
the network interface of the workstation computer sending an error message to a user in response to a determination that the workstation computer includes the email message folder file configured in a format that is different than the authorized format;
the data collection program of the workstation computer collecting data from the workstation computer;
the processor of the workstation computer writing the collected data to the central server computer, wherein a user directory is created at the central server computer for storage of the collected data based on a user name and workstation computer name and a mounted drive is determined to be either a remote drive type or not a remote drive type, wherein for a not remote drive type, files in the drive are transferred to the user directory at the central server computer and for the remote drive type, share drive information for the remote drive type is saved in a text file and transferred to the user directory at the central server computer;
the network interface of the workstation computer severing the connection between the workstation computer and the central server computer; and
the data collection program installed on the workstation computer deleting files related to execution of the data collection program after the data is collected and written to the central server computer.

8. The system of claim 7, wherein collecting data from the workstation includes retrieving available user information from the received user information, displaying available user information in a pre-populated form, and prompting the user for corrections to data in the pre-populated form.

9. The system of claim 7, wherein the collecting the data further comprises:
collecting user personal information; and
collecting workstation information.

10. The system of claim 9, wherein the collecting the user personal information comprises:
obtaining an email address of the user.

11. The system of claim 10, further comprising:
the central server computer determining an email server associated with the obtained email address of the user.

12. The system of claim 11, further comprising:
the central server computer querying an administrator of the email server to provide a copy of the user's emails from the email server; and
the central server computer receiving a copy of the emails from the queried administrator.

13. The system of claim 11, further comprising:
the central server computer querying an administrator of the email server to provide a copy of the user's email mailbox; and
the central server computer receiving a copy of the user's email mailbox from the queried administrator.

14. The method of claim 1, wherein the email file format is a .pst email format.

15. A system for collecting information comprising:
a workstation computer processor configured to execute logic components stored in memory of the workstation computer, the logic components comprising:
an establishing component configured to install a data collection program on a local storage device of the workstation computer and establish a connection between the workstation computer and a central server computer to collect data from the workstation computer by the data collection program;
a determining component configured to determine, at the workstation computer, whether the workstation computer includes an email message folder file configured in an authorized format;
a sending component configured to, in response to a determination that the workstation computer includes the email message folder file configured in a format that is different than the authorized email message folder file format, send an error message to a user;
a collecting component configured to collect data from the workstation computer by the data collection program;
a writing component configured to write the collected data to the central server computer, wherein a user directory is created at the central server computer for storage of the collected data based on a user name and workstation computer name and a mounted drive is determined to be either a remote drive type or not a remote drive type, wherein for a not remote drive type, files in the drive are transferred to the user directory at the central server computer and for the remote drive type, share drive information for the remote drive type is saved in a text file and transferred to the user directory at the central server computer;
a severing component configured to sever the connection between the workstation computer and the central server computer; and
a deleting component configured to delete files related to execution of the data collection program after the data is collected and written to the central server computer.

16. The system of claim 15, wherein the collecting component further comprises:
a personal information component configured to collect user personal information; and
a workstation information component configured to collect workstation information.

17. The system of claim 16, wherein the personal information component comprises:
an obtaining component configured to obtain an email address of the user.

18. The system of claim 17, further comprising:
a server determining component configured to determine an email server associated with the obtained email address of the user.

19. The system of claim 18, further comprising:
a server querying component configured to query an administrator of the email server to provide a copy of the user's emails from the email server; and
a server receiving component configured to receive a copy of the emails from the queried administrator.

20. The system of claim 18, further comprising:
a mailbox querying component configured to query an administrator of the email server to provide a copy of the user's email mailbox; and
a mailbox receiving component configured to receive a copy of the user's email mailbox from the queried administrator.

21. A non-transitory computer-readable storage medium that includes a program for collecting information that, when executed by a computer, causes the computer to perform at least the following:
install a data collection program on a workstation;
establish a connection between the workstation and a central server to collect data from the workstation by the data collection program;
collect data by the data collection program from the workstation, wherein collecting data from the workstation includes receiving a copy of at least one file previously accessed by a user of the workstation;
determine, at the workstation, whether the workstation includes an email message folder file configured in a format that is different than an authorized email message folder file format;
in response to a determination that the workstation includes the email message folder file configured in a format that is different than the authorized email message folder file format, send an error message to a user;
write the collected data to the central server, wherein a user directory is created at the central server for storage of the collected data based on a user name and workstation computer name and a mounted drive is determined to be either a remote drive type or not a remote drive type, wherein for a not remote drive type, files in the drive are transferred to the user directory at the central server and for the remote drive type, share drive information for the remote drive type is saved in a text file and transferred to the user directory at the central server;
sever the connection between the workstation and the central server; and
delete files related to execution of the data collection program after the data is collected and written to the central server.

22. The non-transitory computer-readable storage medium of claim 21, wherein collecting the data comprises:
computer-readable code configured to instruct a programmable device to collect user personal information; and
computer-readable code configured to instruct a programmable device to collect workstation information.

23. The non-transitory computer-readable storage medium of claim 22, wherein collecting the user personal information comprises:
computer-readable code configured to instruct a programmable device to obtain an email address of the user.

24. The non-transitory computer-readable storage medium of claim 23, the program further causing the computer to determine an email server associated with the obtained email address of the user.

25. The non-transitory computer-readable storage medium of claim 24, the program further causing the computer to perform at least the following:
query an administrator of the email server to provide a copy of the user's emails from the email server; and
receive a copy of the emails from the queried administrator.

26. The non-transitory computer-readable storage medium of claim 24, the program further causing the computer to perform at least the following:
query an administrator of the email server to provide a copy of the user's email mailbox; and
receive a copy of the user's email mailbox from the queried administrator.

* * * * *